(12) United States Patent
Kannan et al.

(10) Patent No.: US 12,671,765 B2
(45) Date of Patent: Jun. 30, 2026

(54) SYSTEM AND METHOD FOR IDENTIFYING AND ADDRESSING A REAL-TIME CONVERSATIONAL CONFLICT IN A CONTACT CENTER

(71) Applicant: NICE LTD., Ra'anana (IL)

(72) Inventors: Sudarshan Kannan, Pune (IN); Salil Dhawan, Pune (IN); Ronak Kharadkar, Pune (IN); Pramod Giri, Pune (IN)

(73) Assignee: NICE LTD., Ra'anana (IL)

( * ) Notice: Subject to any disclaimer, the term of this patent is extended or adjusted under 35 U.S.C. 154(b) by 124 days.

(21) Appl. No.: 18/811,831

(22) Filed: Aug. 22, 2024

(65) Prior Publication Data

US 2026/0059051 A1     Feb. 26, 2026

(51) Int. Cl.
| | |
|---|---|
| *H04M 3/523* | (2006.01) |
| *G10L 15/26* | (2006.01) |
| *H04L 65/65* | (2022.01) |
| *H04M 3/51* | (2006.01) |

(52) U.S. Cl.
CPC .......... *H04M 3/5237* (2013.01); *G10L 15/26* (2013.01); *H04L 65/65* (2022.05); *H04M 3/5175* (2013.01)

(58) Field of Classification Search
CPC ............. H04M 3/5237; H04M 3/5175; H04M 2201/14; H04M 2201/18; H04M 2203/401; G10L 15/26; G10L 25/84; G10L 17/06; H04L 65/65; H04L 65/403; G06F 40/30; G06F 40/35
See application file for complete search history.

(56) References Cited

U.S. PATENT DOCUMENTS

| | | | | |
|---|---|---|---|---|
| 6,600,821 | B1 * | 7/2003 | Chan ...................... | H04M 3/51 379/88.19 |
| 11,528,360 | B2 * | 12/2022 | Brown ................ | H04M 3/5175 |
| 11,588,937 | B2 * | 2/2023 | Mackie ................... | G06F 40/30 |
| 11,652,922 | B2 * | 5/2023 | Ramprashad ..... | H04M 3/42008 379/265.03 |
| 11,736,616 | B1 * | 8/2023 | Rigby ................ | H04M 3/5175 379/265.13 |
| 11,978,442 | B2 * | 5/2024 | Lembersky ............. | G10L 15/22 |
| 2012/0296642 | A1 * | 11/2012 | Shammass ............. | G10L 25/63 704/211 |
| 2022/0201118 | A1 * | 6/2022 | Mackie ............... | H04M 3/5232 |

* cited by examiner

*Primary Examiner* — Akelaw Teshale
(74) *Attorney, Agent, or Firm* — SOROKER NORDMAN RIBA

(57)     ABSTRACT

A computerized-method for identifying and addressing a real-time conversational conflict in a contact center. The computerized-method includes: (i) monitoring by one or more processors an interaction between an agent and a customer; (ii) continuously updating a conflict-score during the interaction when a conversational-cut is detected, by operating by the one or more processors a conflict-detector module. The conversational-cut is a point in the interaction that the agent speech is interrupted by the customer and the agent stops speaking, and (iii) addressing the real-time conversational conflict when the updated conflict-score is above a preconfigured conflict-threshold by routing the interaction to a queue of Subject Matter Experts (SME)s of an Automatic Calls Distributor (ACD) application.

10 Claims, 19 Drawing Sheets

One or more processors

Conflict-detector module conflict-score

Automatic Calls Distributor (ACD) application queue of Subject Matter Experts (SME)s

100

110

120

130

140

150

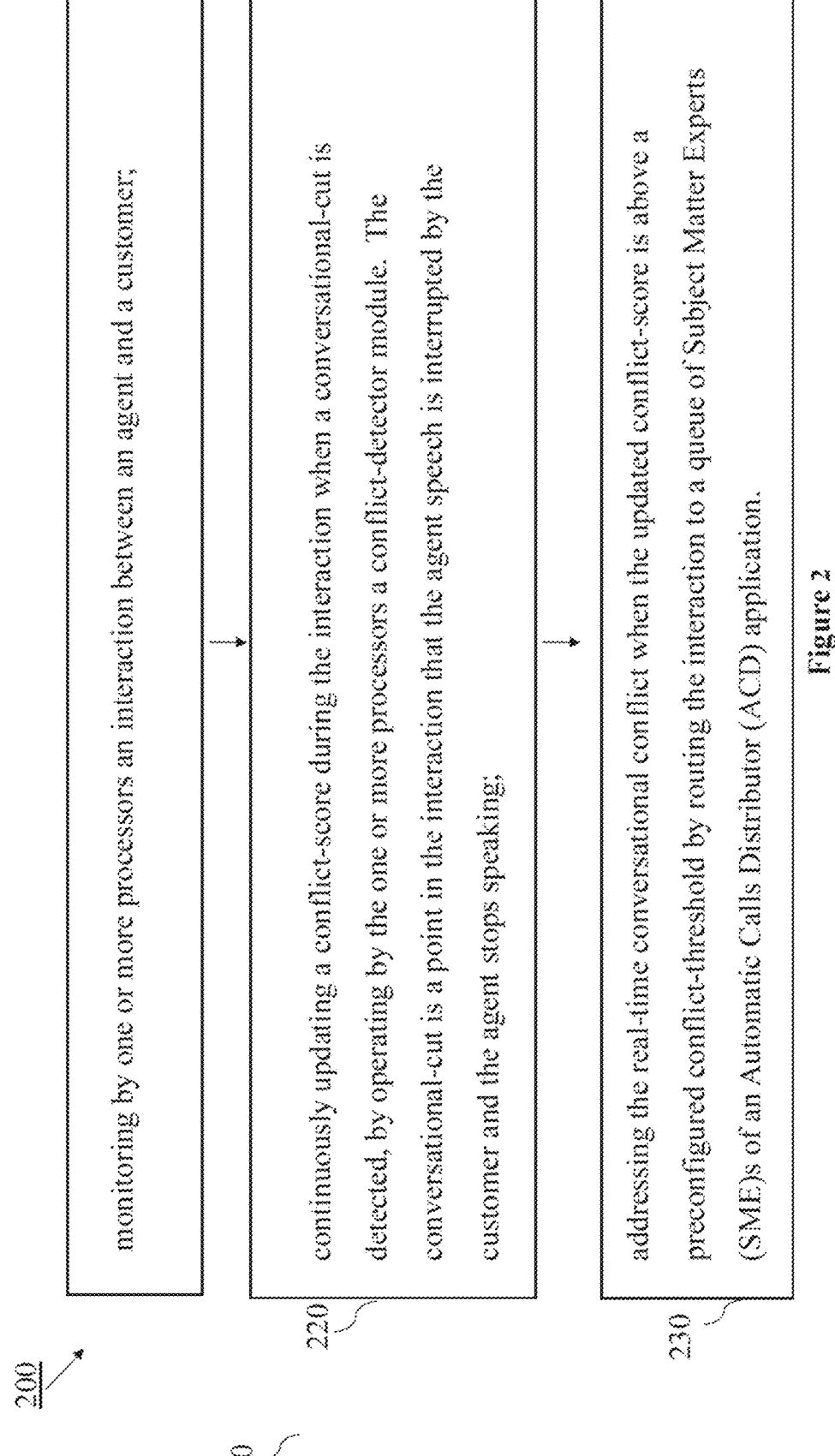

200

210 monitoring by one or more processors an interaction between an agent and a customer;

220 continuously updating a conflict-score during the interaction when a conversational-cut is detected, by operating by the one or more processors a conflict-detector module. The conversational-cut is a point in the interaction that the agent speech is interrupted by the customer and the agent stops speaking;

230 addressing the real-time conversational conflict when the updated conflict-score is above a preconfigured conflict-threshold by routing the interaction to a queue of Subject Matter Experts (SMEs) of an Automatic Calls Distributor (ACD) application.

Figure 8:
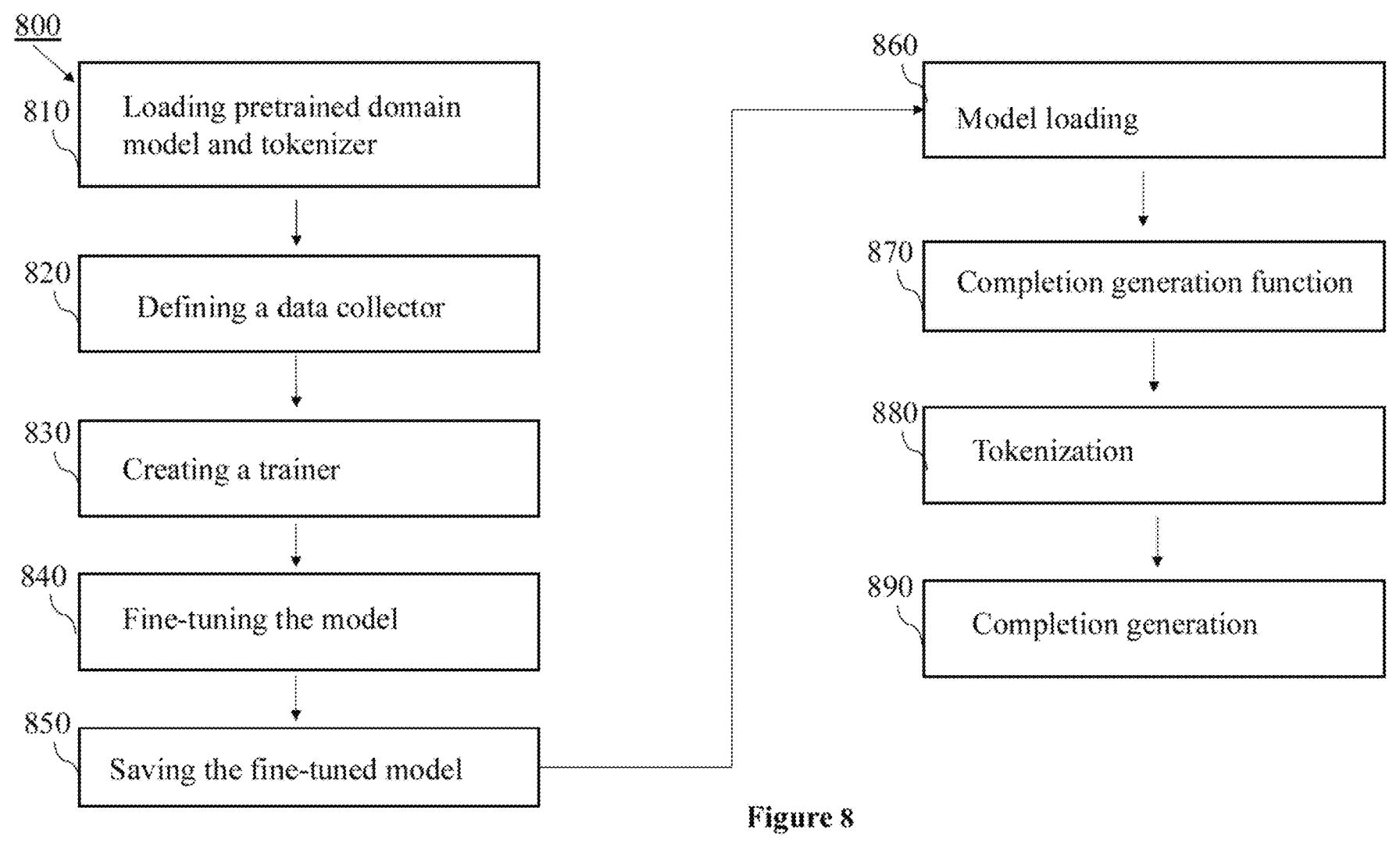

860 Model loading

870 Completion generation function

880 Tokenization

890 Completion generation

800

810 Loading pretrained domain model and tokenizer

820 Defining a data collector

830 Creating a trainer

840 Fine-tuning the model

850 Saving the fine-tuned model

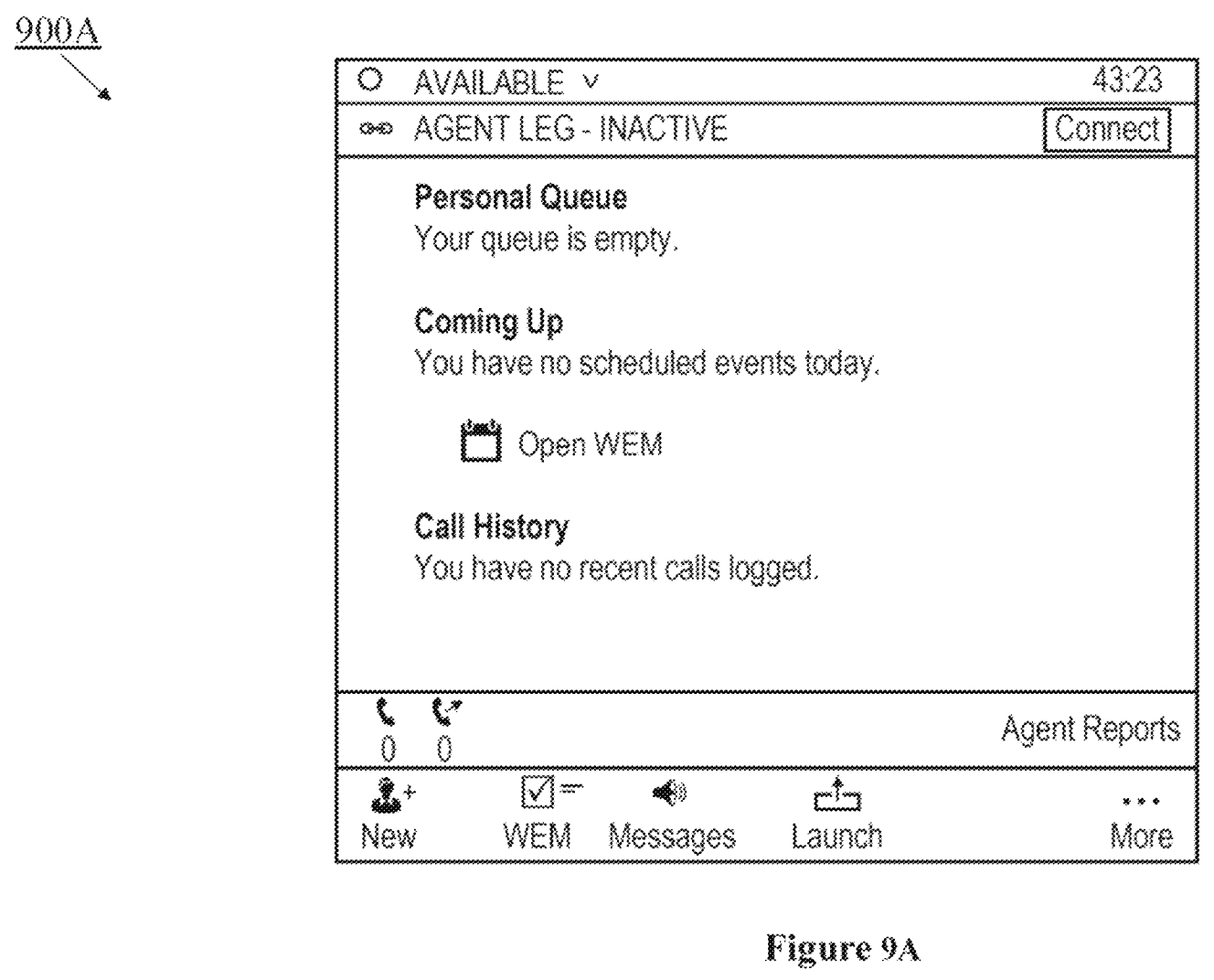

900A

○ AVAILABLE ⌄                                    43:23

⊶ AGENT LEG - INACTIVE                          | Connect |

Personal Queue
Your queue is empty.

Coming Up
You have no scheduled events today.

📅 Open WEM

Call History
You have no recent calls logged.

☎ ☎
0 0

New    WEM    Messages    Launch    Agent Reports

⋮
More

Figure 9A

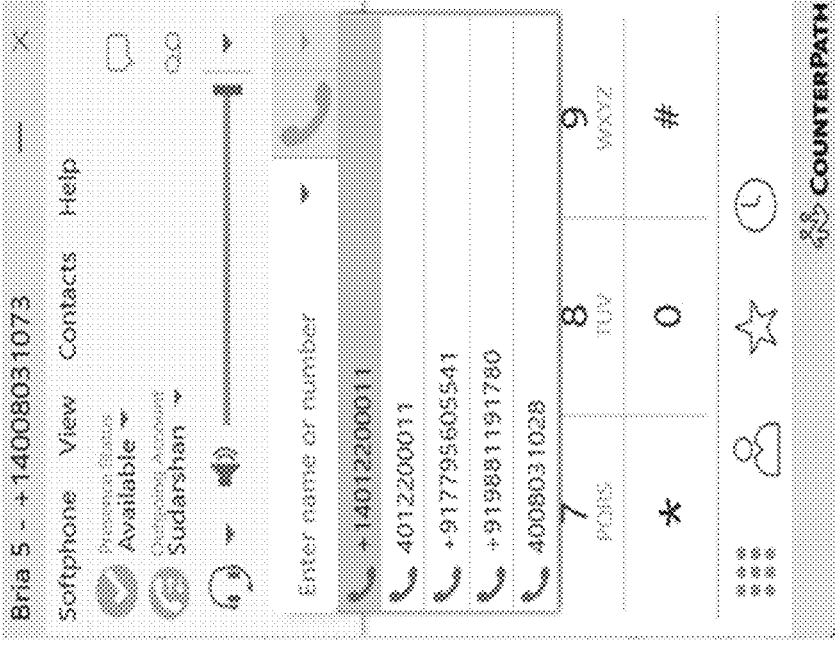
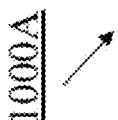
Figure 10A

1000D

1000E

SYSTEM AND METHOD FOR IDENTIFYING AND ADDRESSING A REAL-TIME CONVERSATIONAL CONFLICT IN A CONTACT CENTER

COPYRIGHT NOTICE

TECHNICAL FIELD

The present disclosure relates to the field of monitoring an interaction in real time and for identifying and addressing a real-time conversational conflict in a contact center by using Artificial Intelligence (AI) model.

BACKGROUND

When contact center agents and customers interact in a voice conversation, there are many instances where conflicts may arise during the conversation which result in irate customers. The problem with irate customers is that once they are in a complaining mode, they stop listening to the agent even to factual or useful responses by the agent.

Moreover, since a call center agent is a low-profile employee, the already irate customer tends to overpower anything that the agent says or wants to say. A frustrated customer may vent out the anger on a low-profile employee, e.g., agent without letting the agent speak and may insist thereafter to escalate the case to a person holding a higher designation.

Accordingly, there is a need for a technical solution that will measure the level of conflicts in contact center real-time conversations and will route the interaction having a high volume of conflicts in real-time to a next level hierarchy queue of Subject matter Experts (SME), such as supervisors, managers, superiors, and senior agents in the contact center.

There is a need for system and method for identifying and addressing a real-time conversational conflict in a contact center.

SUMMARY

There is thus provided, in accordance with some embodiments of the present disclosure, a computerized-method for identifying and addressing a real-time conversational conflict in a contact center.

Furthermore, in accordance with some embodiments of the present disclosure, the computerized-method may include: (i) monitoring by one or more processors an interaction between an agent and a customer; (ii) continuously updating a conflict-score during the interaction when a conversational-cut is detected, by operating by the one or more processors a conflict-detector module. The conversational-cut is a point in the interaction that the agent speech is interrupted by the customer and the agent stops speaking, and (iii) addressing the real-time conversational conflict when the updated conflict-score is above a preconfigured conflict-threshold by routing the interaction to a queue of Subject Matter Experts (SME)s of an Automatic Calls Distributor (ACD) application.

Furthermore, in accordance with some embodiments of the present disclosure, the conflict-detector module may include: (i) determining an interruption and related time-stamp when the agent was speaking at the time that the customer started to speak and the agent stopped speaking after the customer started to speak, by operating a voice analyzer; (ii) when the interruption has been determined, retrieving real-time transcripts of customer speech and agent speech. The real-time transcripts of customer speech and agent speech have been generated by a Speech Recognition (SR) engine; (iii) generating customer-transcript segments of the real-time transcripts of the customer and agent-transcript segments of the real-time transcripts of the agent by operating a transcript analyzer; (iv) predicting a remaining portion of agent speech by operating a trained Agent Speech Predictor (ASP) engine; (v) operating sentiment analysis on the customer-transcript segments and the agent-transcript segments by operating a sentiment analyzer; and (vi) detecting the conversational-cut when the predicted remaining portion of agent speech is greater than a preconfigured threshold. The related agent-transcript segments and predicted agent-transcript segments are stored in a database after the conversational-cut has been detected.

Furthermore, in accordance with some embodiments of the present disclosure, the voice analyzer may include: (i) streaming agent speech via a first Real-time Transport Protocol (RTP) port and streaming customer speech via a second RTP port; (ii) extracting audio data from the first RTP port and the second RTP port and transcoding the extracted audio data into linear samples in floating point format; (iii) organizing the linear samples into an audio-frames sequence; (iv) removing noise audio-frames from the audio-frames sequence; (iv) detecting each start of sentence in a customer speech and in an agent speech by operating a pattern recognizer; and (v) detecting if the agent was still speaking when the customer started to speak and if the agent stopped speaking after the customer started to speak.

Furthermore, in accordance with some embodiments of the present disclosure, the voice analyzer may further identify a category of the audio-frame as one of: a. silent; b. voice; and c. noise. The voice analyzer may identify the category of the audio-frame by estimating amount of energy in each audio-frame in the audio-frames by operating a time domain analysis.

Furthermore, in accordance with some embodiments of the present disclosure, the audio-frame may be identified as silent when the estimated amount of energy is less than a preconfigured dynamic-threshold.

Furthermore, in accordance with some embodiments of the present disclosure, the voice analyzer may detect each start of sentence by marking of a timestamp of a first voice audio-frame as a start of sentence. The marking of the timestamp may be performed by operating a pattern recognizer. The pattern recognizer may include processing a set of instructions for each pattern of audio-frames in category silence and audio frames in category voice in the audio-frames sequence to detect a start of sentence timestamp.

Furthermore, in accordance with some embodiments of the present disclosure, the voice analyzer may detect if the agent stopped speaking after the customer interrupted the agent and started to speak while the agent was speaking, by checking if there were no voice audio-frames of the agent with marked timestamp in a preconfigured time-distance to the marked timestamp of the voice audio-frames denoting start of the interrupted sentence of the customer.

Furthermore, in accordance with some embodiments of the present disclosure, the SR engine may include listening to the first RTP port to generate real-time agent-transcripts and listening to the second RTP port to generate real-time customer-transcripts. The transcript analyzer may include: (i) extracting from the real-time transcripts of the customer, customer-transcript segments, based on the interruption related timestamp; and (ii) extracting from the real-time transcripts of the agent, agent-transcript segments, based the interruption related timestamp.

Furthermore, in accordance with some embodiments of the present disclosure, the ASP engine may be an Artificial Intelligence (AI) model that is trained to predict the remaining portion of the agent speech based on speech corpus having customer-agent interactions of contact center companies from different domains.

Furthermore, in accordance with some embodiments of the present disclosure, the sentiment analyzer may include: (i) operating sentiment analysis on the customer-transcript segments to yield a customer sentiment. The customer sentiment may be one of: positive, negative and neutral; (ii) when the yielded customer sentiment is negative: a. comparing the customer-transcript segments with the agent-transcript segments and the predicted agent-transcript segments to determine level of usefulness of the agent's response to the customer's query; and thereby determining a level of genuineness of the customer sentiment; and b. updating a weight of the conversational-cut based on the determined level of genuineness.

Furthermore, in accordance with some embodiments of the present disclosure, the interaction may be routed based on conflict-score by the ACD application to a queue of Subject Matter Experts (SMEs).

BRIEF DESCRIPTION OF THE DRAWINGS

FIG. 2 is a high-level workflow of a computerized-method for identifying and addressing a real-time conversational conflict in a contact center, in accordance with some embodiments of the present disclosure;

FIG. 8 is a high-level workflow of Agent Speech Predictor (ASP) model training, in accordance with some embodiments of the present disclosure;

FIGS. 9A-9B are screenshots of User Interface (UI) for routed calls from agent to SME, in accordance with some embodiments of the present disclosure; and FIGS. 10A-10E are screenshots of UI of agent software for inbound calls, in accordance with some embodiments of the present disclosure.

DETAILED DESCRIPTION

Figure 1:
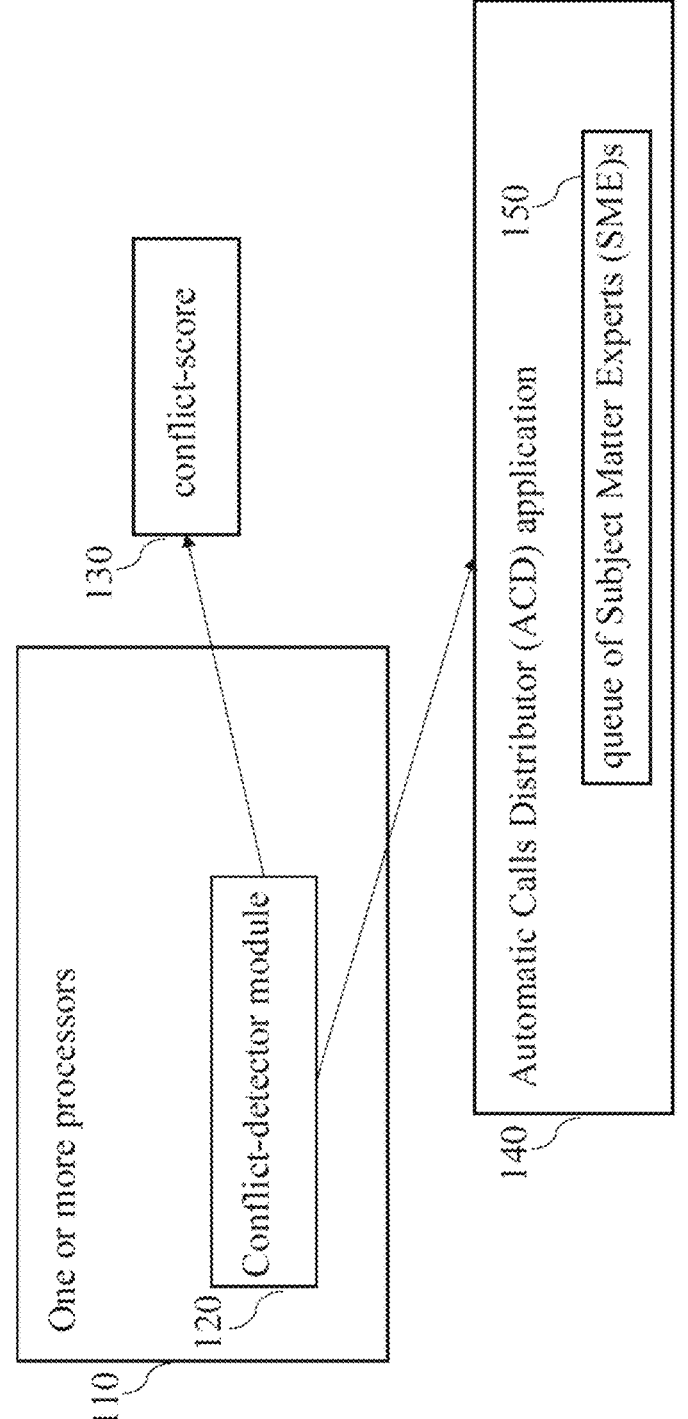
FIG. 1 schematically illustrates a high-level diagram of a system for identifying and addressing a real-time conversational conflict in a contact center, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "conversational-cut" as used herein refers to a point in an interaction that the agent speech is interrupted by the customer and the agent stops speaking and doesn't talk-over after the interruption.

Currently, there are existing methods which assist the agent with a customer by providing 'data' support to the agent in the form of online documents, Frequently Asked Questions (FAQ)s, help guides and the like, during real-time conversations. When the agent is provided such 'data' assistance in the form of documents or quick guides, it may help the agent to some extent but does not help the agent in conflict-ridden scenarios.

In other existing methods, agents are aided in the form of soft-skills suggestions like "Be Empathetic", "Active Listening" and more. For example, an agent assistance system may send a popup to the agent on the Customer Relationship Management (CRM) screen mentioning that the agent is not being courteous or empathetic enough and needs to make some statement to the customer showing empathy. For example, Real-Time Interaction Guidance (RTIG) product, as described in U.S. Pat. No. 11,978,442, 'Real Time monitoring and supervisor intervention' of Jan. 6, 2022.

The RTIG product includes RTIG scores and a Supervisor Intervention Recommendation engine', which buffers RTIG scores into segments, extracts the features from segments and applies a Machine Learning (ML) model to classify whether each segment is problematic or not. It then collects model results for consecutive segments and alerts the supervisor to intervene in case the ML model results for 'N' consecutive segments were above a predefined threshold. This existing method is not enough in conflict-ridden scenarios when there is one or more conversational-cuts, such as a point in the interaction that the agent speech is interrupted by the customer and the agent stops speaking, because it lacks the count of the number of interruptions during the interaction to determine if an intervention is required.

There are existing methods which measure conflict in a conversation by detecting 'talk-overs' (overlaps or cross-talks) where both parties speak simultaneously. However, in reality, talk-overs arise only 10% of the time in contact center conversations, when the agent is going out of control and not behaving as trained to behave. More than 90 % of conflicts in contact center have conversational-cuts in them. Therefore, conversational-cuts may be an important measure to analyze conflicts in contact center conversations.

There are existing methods of sentiment analysis using Natural Language Processing (NLP), which detects negative phrases in a customer speech after the speech is converted into text. There are also direct voice sentiment analysis methods which detect emotions like anger, pitch, loudness, sadness and the like, in customer speech.

However, the existing sentiment analysis methods only analyze the customer side speech or transcript to identify the sentiment. However, existing sentiment analysis lacks the dimension of customer speech segment comparison with agent's spoken and predicted speech segment, to identify the 'genuineness' of the customer's sentiment. If the customer's sentiment is more genuine, then the sentiment analysis may be more useful, and the sentiment score may be increased by that much factor.

There are existing methods of routing 'overflow' calls from one queue to a second queue. Overflow occurs when there are more incoming calls than what the agents can handle. These 'overflow' calls, after being routed to the second queue, may be connected either to virtual agents or bots or simply a message may be played to customers on these overflow calls with some minimal details that may help the customer for the time being.

However, the current methods of routing calls between queues handle calls that are waiting in the queue, i.e., where customer is still not connected to the agent. Current methods do not generate a queue for interactions where the customer and agent are already connected.

There are existing methods for creating dynamic queue based on 'overflow' of customer calls when existing agents are not able to handle the inflow traffic. However, there is no dynamic second queue, which leverages the ACD capabilities, to route conflict-ridden calls in real-time. As currently, a supervisor may use existing Computer Telephony Integration (CTI) applications on the CRM interface to barge-in to an existing call or the agent may transfer or conference the supervisor after first confirming the availability of supervisor.

Currently, supervisors or SMEs are available to assist the agents, but they do not login to a higher skill queue and become 'available' to receive calls as part of the Automatic Call Distribution (ACD) system upon an appropriate supervisor for a monitored call.

Accordingly, there is a need for a technical solution that will operate an 'automatic call routing' method from a telephony perspective utilizing inbound ACD engine capabilities, which automatically hunts for supervisors (SME)s available at the time, and routes conflict-ridden calls to SMEs.

Moreover, there is a need to utilize available supervisors equally or uniformly in the contact center. Also, a particular supervisor is not connected on a call based on matching the issue at hand and comparing with the supervisor attribute, e.g., area of expertise.

There is a need for a technical solution that will measure conflicts as accurately as possible in contact center real-time conversations and route the call in real-time to a next level hierarchy queue of SMEs. The SMEs can be supervisors, managers, superiors, and senior agents in the contact center.

FIG. 1 schematically illustrates a high-level diagram of a system 100 for identifying and addressing a real-time conversational conflict in a contact center, in accordance with some embodiments of the present disclosure.

According to some embodiments of the present disclosure, one of contact center manager or supervisor's main challenges is to prevent a situation where an agent and a customer are miscommunicating and are in a state of conflict causing the customer to be irritated and unresponsive. A system, such as system 100 may identify such cases before the situation gets to a "boiling" point, and act in real-time to solve it by addressing the real-time conversational conflict when the updated conflict-score is above a preconfigured conflict-threshold by adding the interaction to a queue of Subject Matter Experts (SME)s 150 of an Automatic Calls Distributor (ACD) application 140. The ACD application 140 may automatically rout the interaction to an SME from the queue.

According to some embodiments of the present disclosure, a system, such as system 100 may detect conflicts in real-time contact center conversations and may automatically route conflict-ridden calls to a next-level hierarchical queue of SMEs by adding the interaction to the queue of SMEs 150 via the ACD application 140. The SMEs can be supervisors, managers, superiors, and senior agents in the contact center.

According to some embodiments of the present disclosure, one or more processors 110 may monitor an interaction between an agent and a customer and continuously update a conflict-score 130 during the interaction when a conversational-cut may be detected by operating a conflict-detector module 120, for example, such as conflict detector 600 in FIG. 6.

Figure 5:
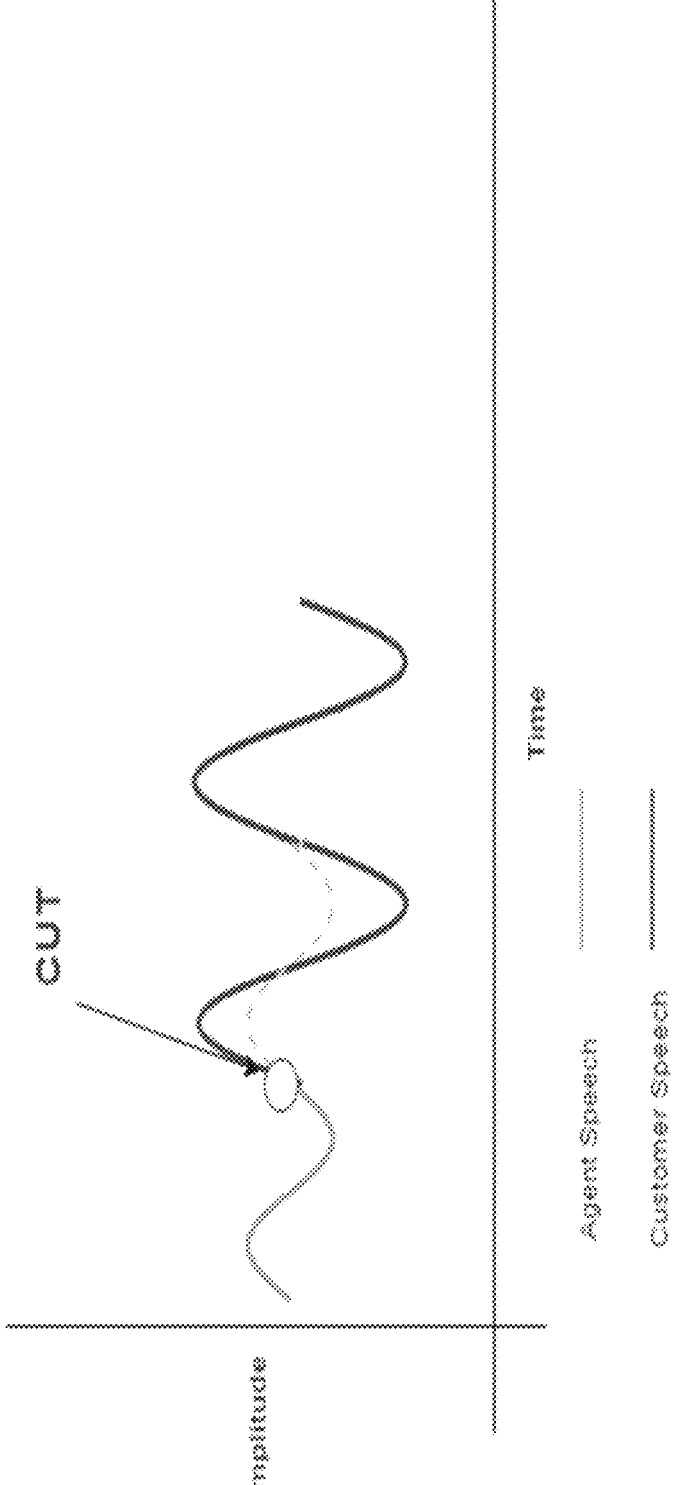
FIG. 5 shows a graph illustrating a conversational-cut, in accordance with some embodiments of the present disclosure.
Figure 6A:
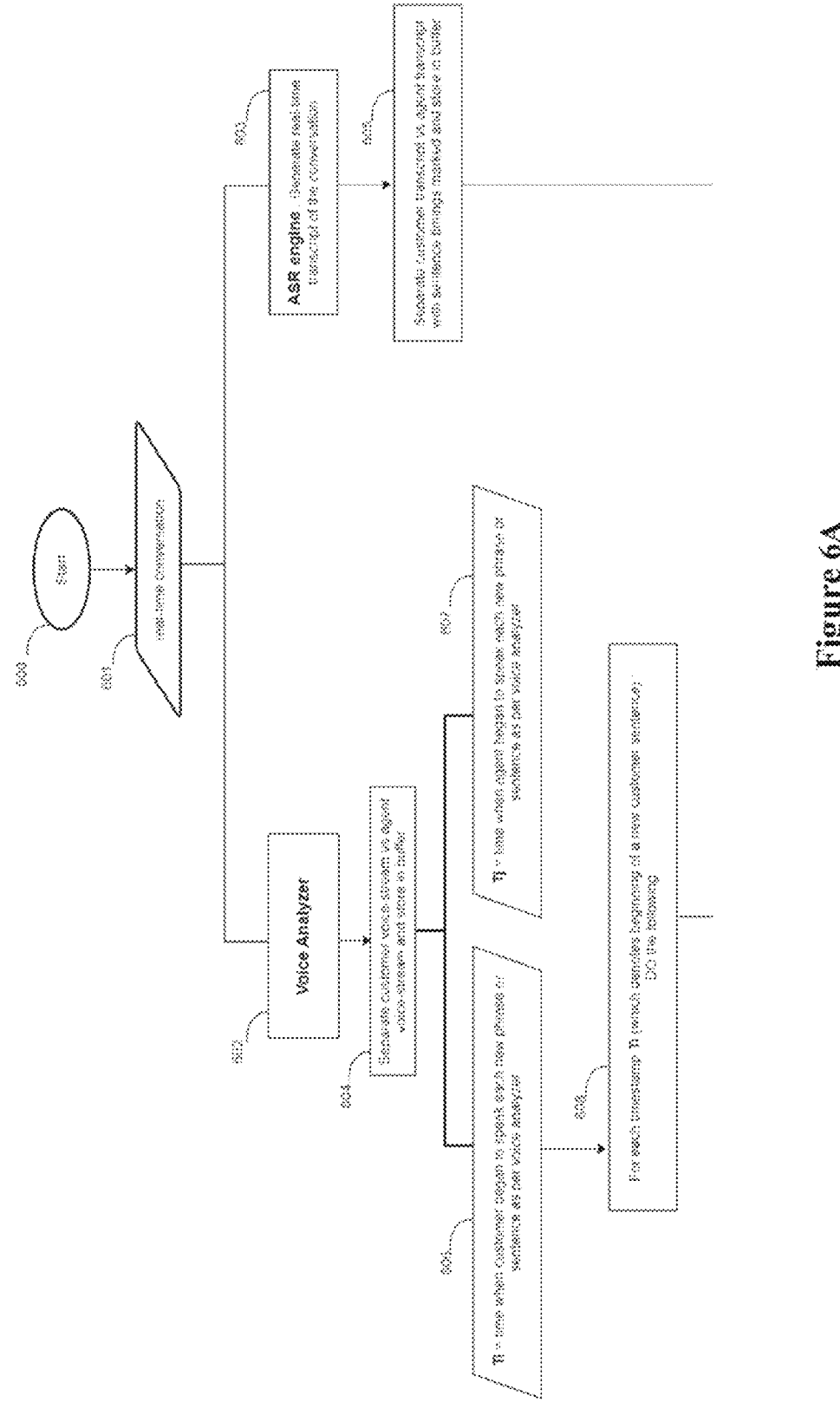
FIGS. 6A-6E show a high-level workflow of a conflict detector module, in accordance with some embodiments of the present disclosure.
Figure 6B:
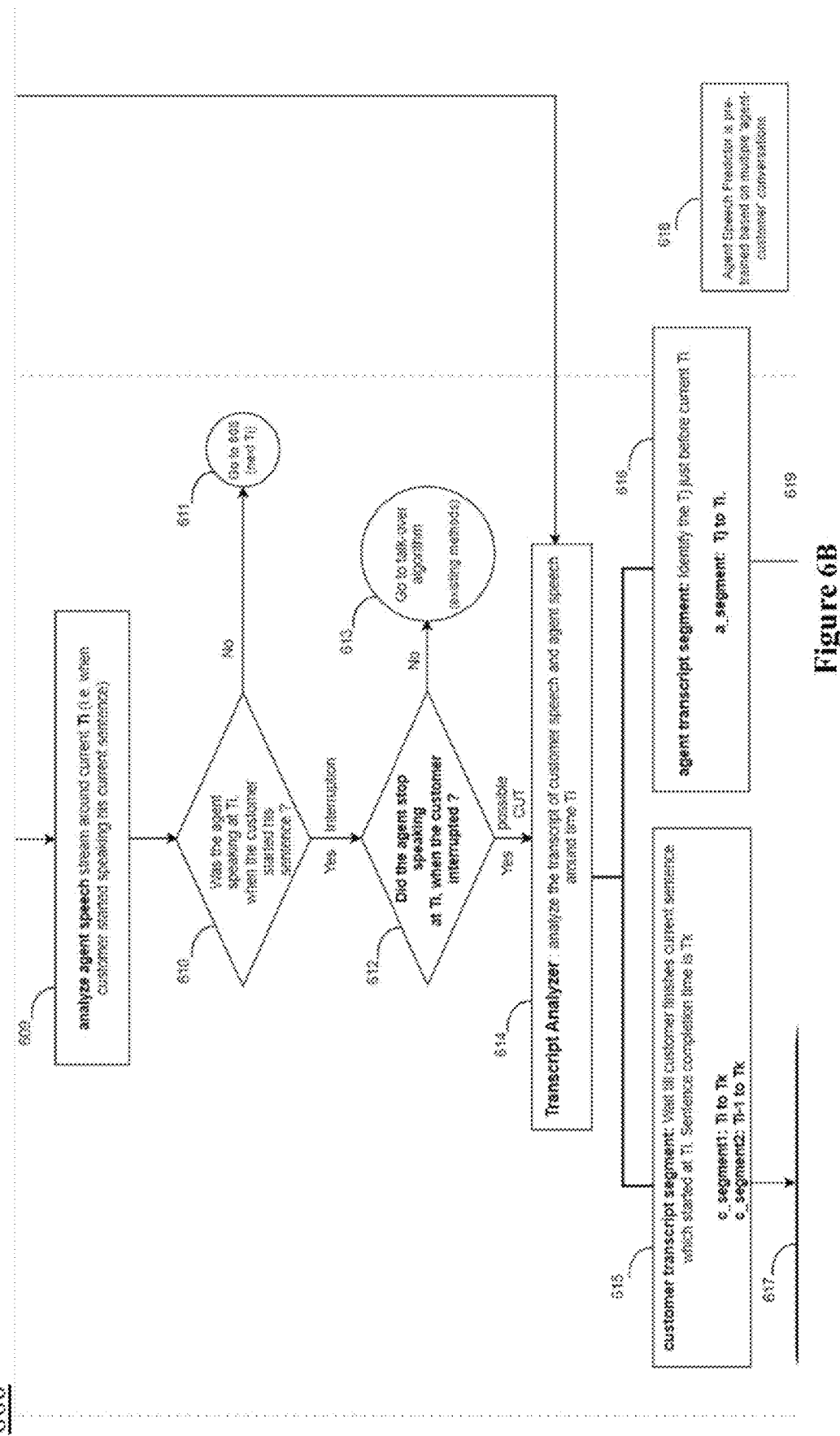
Figure 6C:
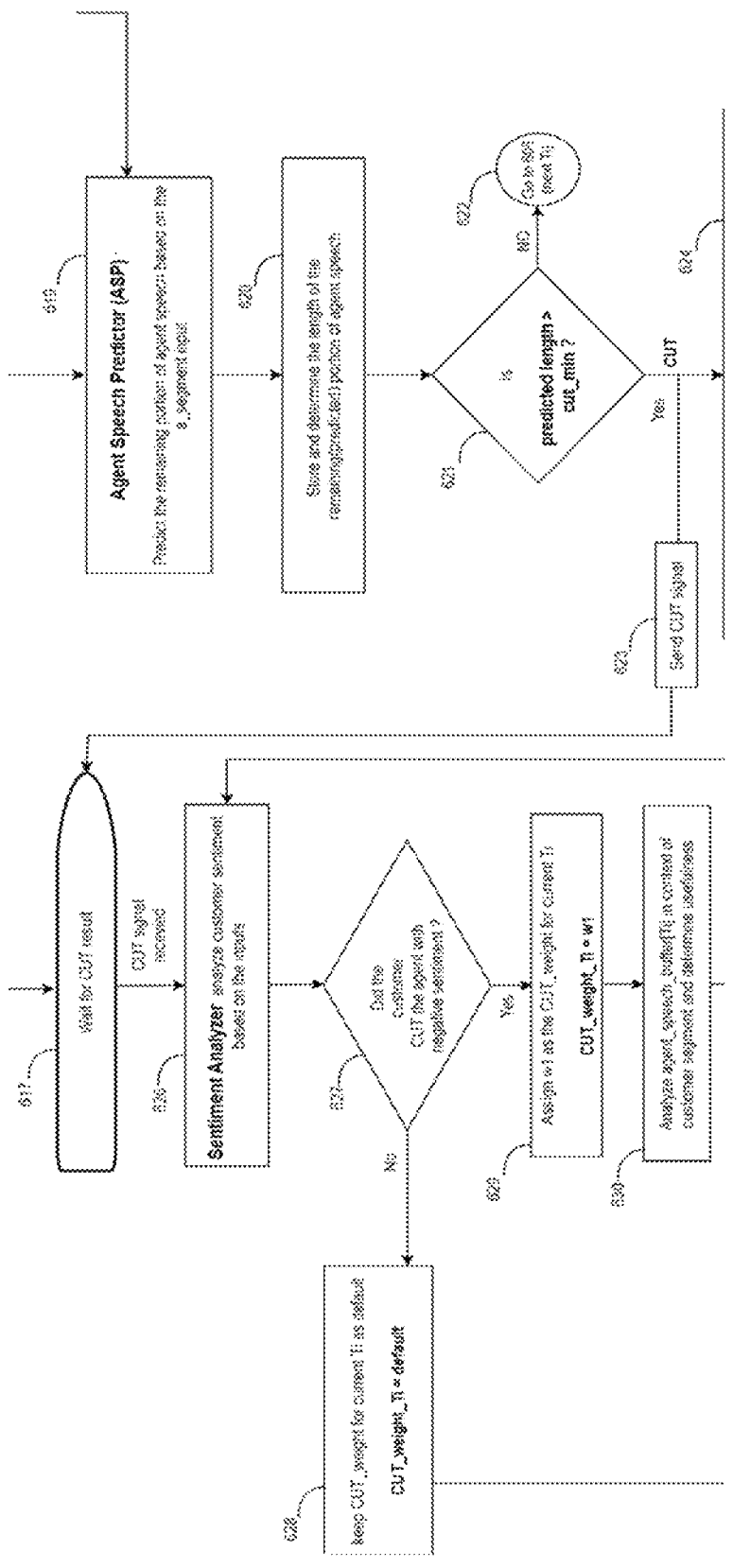
Figure 6D:
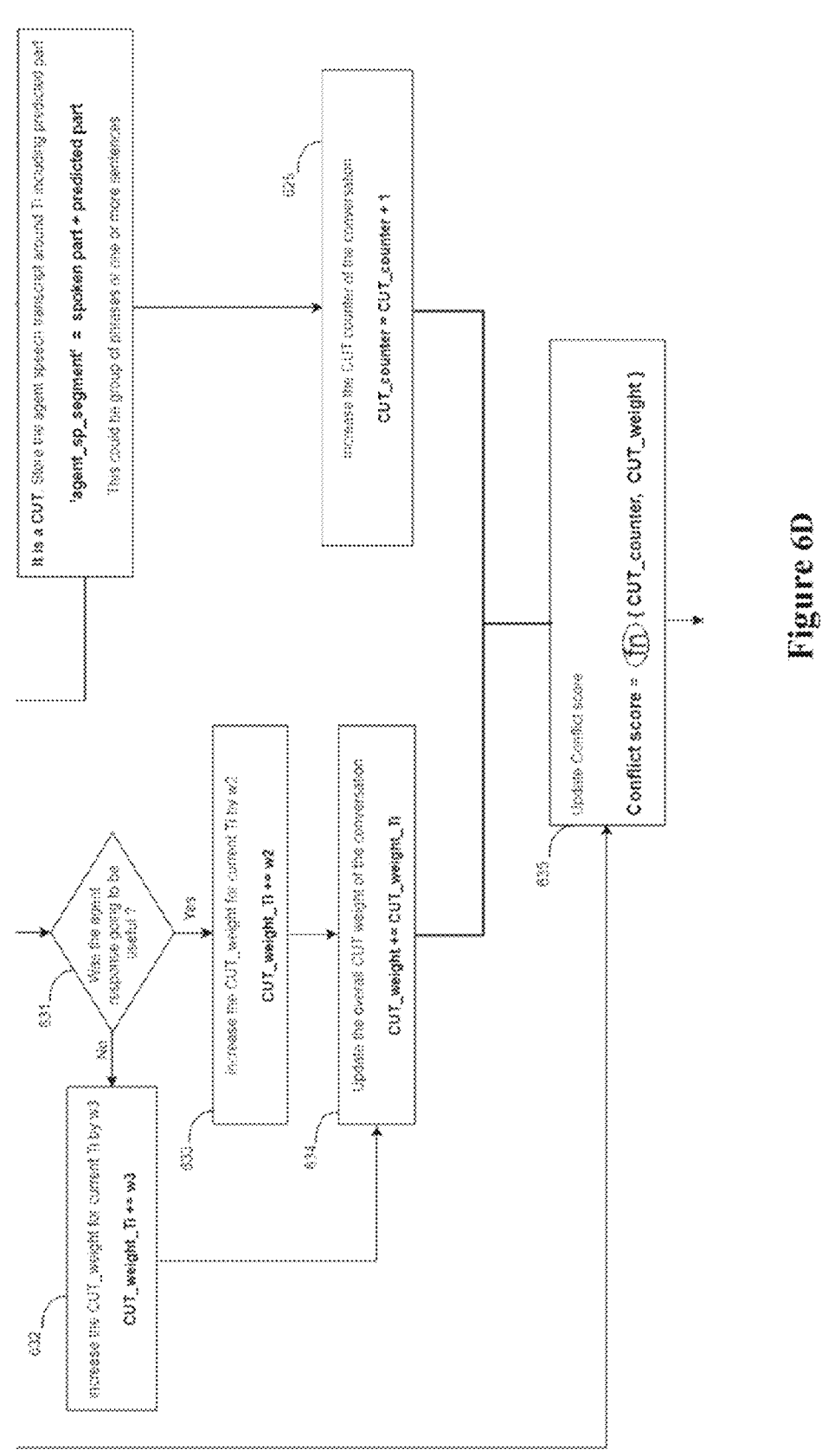
Figure 6E:
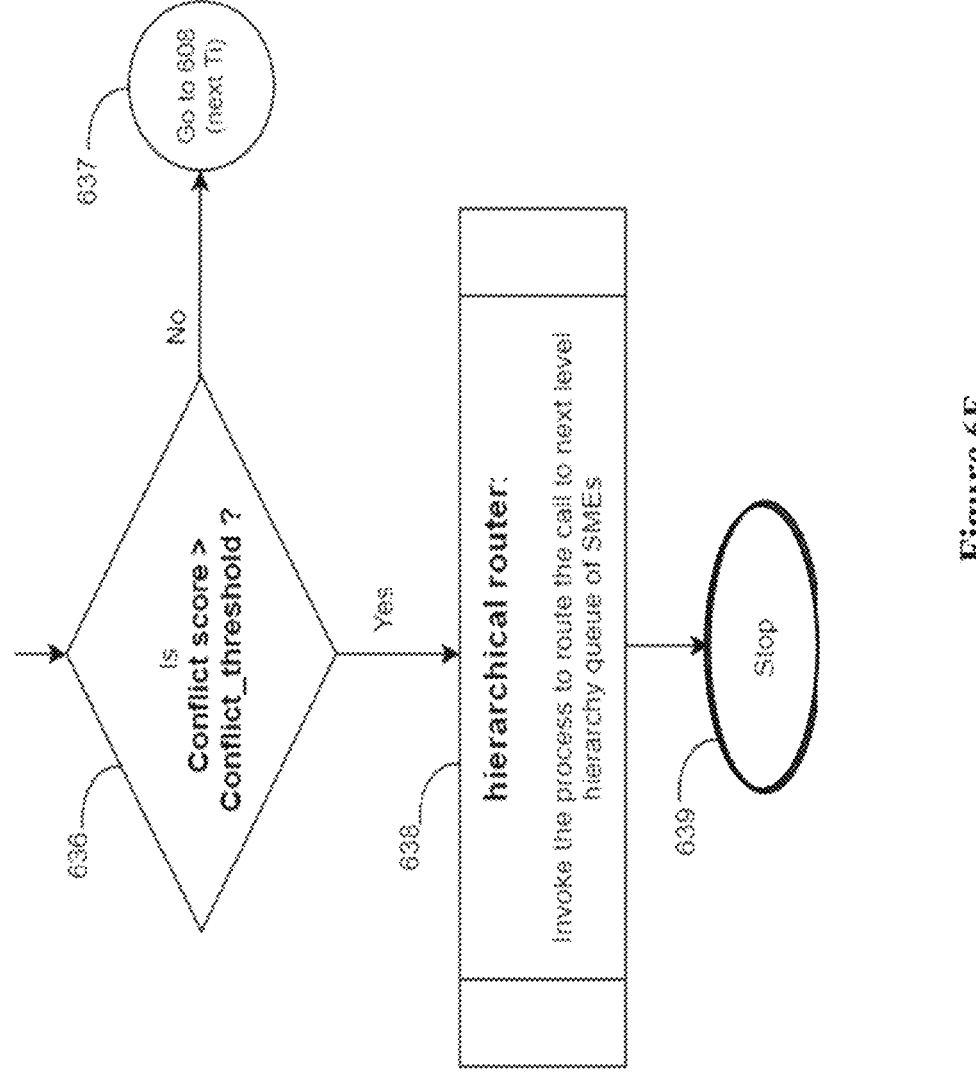

According to some embodiments of the present disclosure, the conversational-cut is a point in the interaction that the agent speech is interrupted by the customer and the agent stops speaking, as shown in FIG. 5.

According to some embodiments of the present disclosure, when the updated conflict-score 130 may be above a preconfigured conflict-threshold, the real-time conversational conflict may be addressed by routing or adding details of the interaction to a queue of (SME)s 150 of an Automatic Calls Distributor (ACD) application 140. The interaction details may be brought to the attention of an SME by adding it to the queue of SMEs 150 that a higher-level agent may attend.

According to some embodiments of the present disclosure, the conversational-cut may occur, when the agent is speaking and the customer interrupts the agent, and the agent almost immediately 'stops' talking, because a contact center agent is trained to listen and not talk-over the customer when the customer is speaking.

According to some embodiments of the present disclosure, when the updated conflict-score 130 is above a preconfigured conflict-threshold a dynamic second queue may be generated, which leverages the ACD capabilities, to route conflict-ridden calls in real-time from the generated queue, e.g. queue of SMEs 150, to SMEs or to add the SME to the real-time interaction.

According to some embodiments of the present disclosure, the second queue is for interactions which are 'established' calls where customers are already connected to agents and the interaction details may be routed or added to the second queue after measuring their conflict-score in real-time. The dynamic second queue may be associated to a high-level of agent as implemented in the contact center hierarchy, so as to involve senior agents, supervisors, and SMEs in the interaction, instead of supervisors and/or SMEs are either manually asked for help by agents or get alerts on their dashboard after which they join an existing conflicted call.

According to some embodiments of the present disclosure, system 100 may provide an automatic routing of interactions having conversational conflict instead of using existing CTI applications on the CRM interface to barge-in to the interaction or the agent transferring the interaction or conference the supervisor after confirming the availability of supervisor.

According to some embodiments of the present disclosure, the 'chain' of hierarchy in system 100 is not limited only to a second queue of SMEs. There can be a third queue for SMEs who are even more proficient than the SMEs in the second queue. And then there can be a fourth queue of SMEs consisting of top management people of the contact center company who are in a higher position and authorized decision makers, considered to be higher in the hierarchy chain, yielding multiple levels of hierarchical queues.

According to some embodiments of the present disclosure, system 100 may utilize dynamic second queue generation for 'established' calls between customers and agents, triggered by a detection of conflict on these established calls. Also, the second queue may not connect to an Interactive Voice Response (IVR) or virtual agent, but instead it may connect to an appropriate supervisor or SME. Till now, supervisors in contact centers were not logging into a skill and their intervention on conflicted calls was manual, after the agent seeks help or after the conflict is reported in some kind of supervisor dashboard.

Figure 10B:
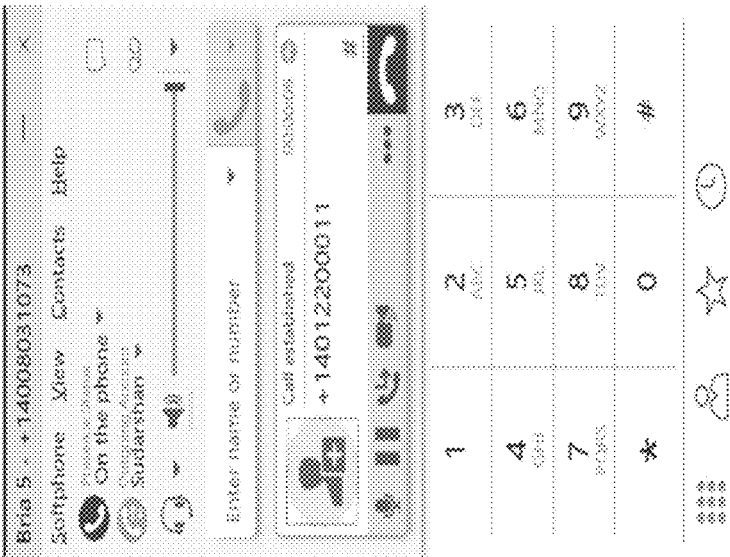
Figure 10C:
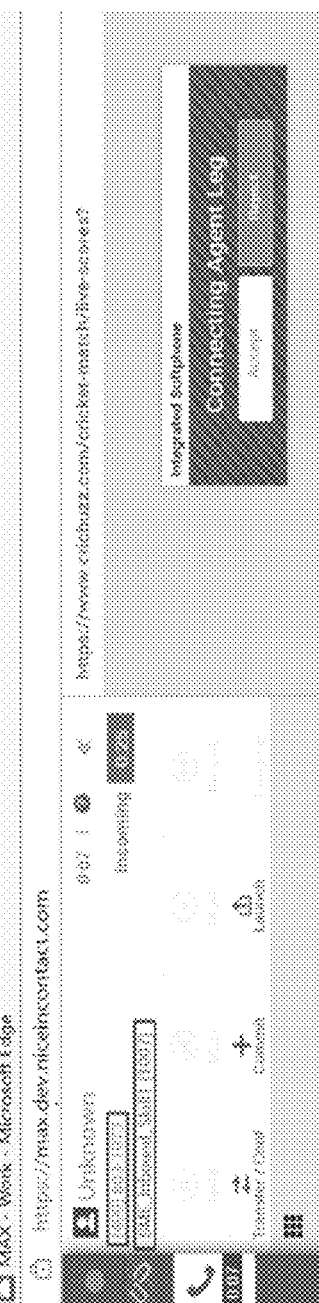

According to some embodiments of the present disclosure, system 100 may use the inbound ACD queue, e.g., the second queue for supervisors by having them login to a higher-level skill, for example, as shown in UI 1000C in FIG. 10C. The skill and attribute level hunting capabilities of the inbound ACD may be leveraged in the second queue to get to the suitable supervisor who may assist the agent in the conflicted conversation. It may also result in uniform utilization of available SMEs in the contact center and based on the area of expertise.

According to some embodiments of the present disclosure, system 100 may be incorporated into existing products or solutions, enhancing the existing capabilities to "identify" in real-time an escalated conflict and help the agent and supervisor "act" at the right moment. The conflict detector module 120 may identify "conflict" by implementing a method, such as computerized-methos 200 in FIG. 2, for identifying conversational-cuts in the real-time conversation and predicting the remaining portion that the agent was going to speak, e.g., by using a trained Agent Speech Predictor (ASP) Artificial Intelligence (AI) model. This way of identifying conflicts in an interaction is required in contact center conversations where the agent is trained to not speak over the customer.

According to some embodiments of the present disclosure, system 100 may be added both to Agent Real Time Interaction Guidance (RTIG) product as well as to supervisor dashboard to indicate and alert on conflicts and if the next score is above conflict threshold, then an intervention in the interaction may be required and hence the details of the interaction may be forwarded to an hierarchical router that may route or add the interaction to an SME by adding the details of the interaction to a second queue. Supervisor attention, or automatically route the conflict-ridden call to a second level support via the hierarchical router, e.g. hierarchical router 717 in FIG. 7, for further assistance.

According to some embodiments of the present disclosure, system 100 may anticipate a conversation flow and create an automated routing system to assist the agent by including an SME in the conversation when a conversational conflict is detected. It may promote the Net Promoter Score (NPS) improvements for users by patron needs by increasing the speed of meeting customer's needs.

According to some embodiments of the present disclosure, in conflict scenarios, such passive assistance through population of information on the problem subject from knowledge-base or guidance about soft-skills will be of no use for a large section of customers who are not happy with the progress on their open ticket. Some of these customers have even formed an initial opinion that the current agent on call cannot help them at all.

According to some embodiments of the present disclosure, in these situations, the agent may already know the informational update on the customer ticket and doesn't need any informational or data assistance, but just needs to pacify the customer and engage a supervisor or someone at a higher position to re-instill customer's confidence and provide any additional help based on supervisor's experience. System 100 may handle this section of irate customers by identifying a plurality of conflicts in the conversion, and once a conflict score reaches a particular threshold, auto-route the real-time call to a hierarchical queue of SMEs, e.g., second queue.

According to some embodiments of the present disclosure, once such a call is connected to an SME, the status or progress of the customer ticket may be the same and the next steps to be taken may be the same, including timelines for resolution, which the original agent was aware-of and was going to inform the customer. Eventually, after escalation, the SME may say the same thing, but the irate customer would, in most cases, mellow down the tone of voice and listen to the response on the issue when it comes from the SME.

According to some embodiments of the present disclosure, the customer may want to hear the same commitment from a superior in terms of resolution which the agent had already given earlier. Hearing the same commitment from superior helps restore customer confidence in many cases.

According to some embodiments of the present disclosure, there may also be cases where the supervisor may actually have more information or may be able to provide workaround or solution to the problem based on his experience and know-hows of the business. This extra help that a superior may be able to provide is not usually based on an existing FAQ document or help guide which the call center agents already have access to and have been trained on. This extra value that a superior may be able to add is mainly based on the experience and overall understanding of the company's products and processes.

According to some embodiments of the present disclosure, system 100 for identifying and addressing a real-time conversational conflict in a contact center may monitor by the one or more processors an interaction between an agent and a customer. The system 100 may monitor and identify conflict in all interactions in the contact center or in a criteria-based segmented interactions. For example, all interactions that relate to predefined line of business. The one or more processors may operate the conflict-detector module 120 which may continuously update the conflict-score 130 when a conversational-cut is detected. The conversational-cut may be a point in the interaction that the agent speech is interrupted by the customer and the agent stops speaking.

According to some embodiments of the present disclosure, the real-time conversational conflict may be addressed when the updated conflict-score may be above a preconfigured conflict-threshold by routing the interaction to a queue of SMEs 150 of an Automatic Calls Distributor (ACD) application 140. The interaction may be routed by the ACD application 140 based on the conflict-score to a queue of Subject Matter Experts (SMEs). An SME may select via a User Interface (UI) the interaction from the SME queue, or the interaction may be automatically routed from the SME queue 150 to the SME.

Figure 3:
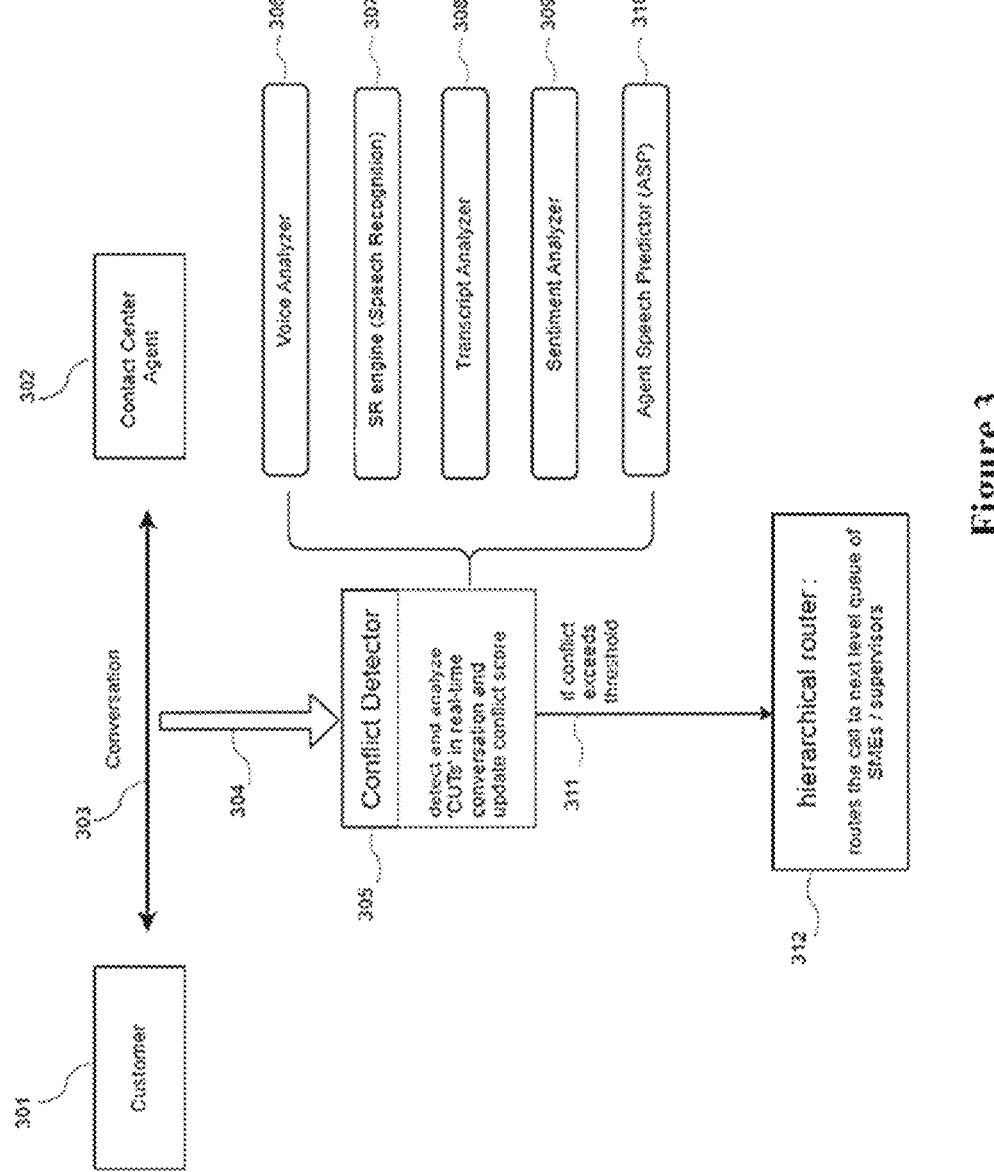
FIG. 3 schematically illustrates a high-level diagram of a system for identifying and addressing a real-time conversational conflict in a contact center, in accordance with some embodiments of the present disclosure.

According to some embodiments of the present disclosure the conflict-detector module may determine an interruption and related timestamp when the agent was speaking at the time that the customer started to speak and the agent stopped speaking after the customer started to speak, by operating a voice analyzer, such as voice analyzer 306 in FIG. 3. Then, when the interruption has been determined, real-time transcripts of customer speech and agent speech may be retrieved. The real-time transcripts of customer speech and agent speech have been generated by a Speech Recognition (SR) engine, such as SE engine 307 in FIG. 3.

According to some embodiments of the present disclosure, the conflict-detector module 120 may generate customer-transcript segments of the real-time transcripts of the customer and agent-transcript segments of the real-time transcripts of the agent by operating a transcript analyzer and then predicting a remaining portion of agent speech by operating a trained Agent Speech Predictor (ASP) engine, such as ASP 310 in FIG. 3.

Figure 4:
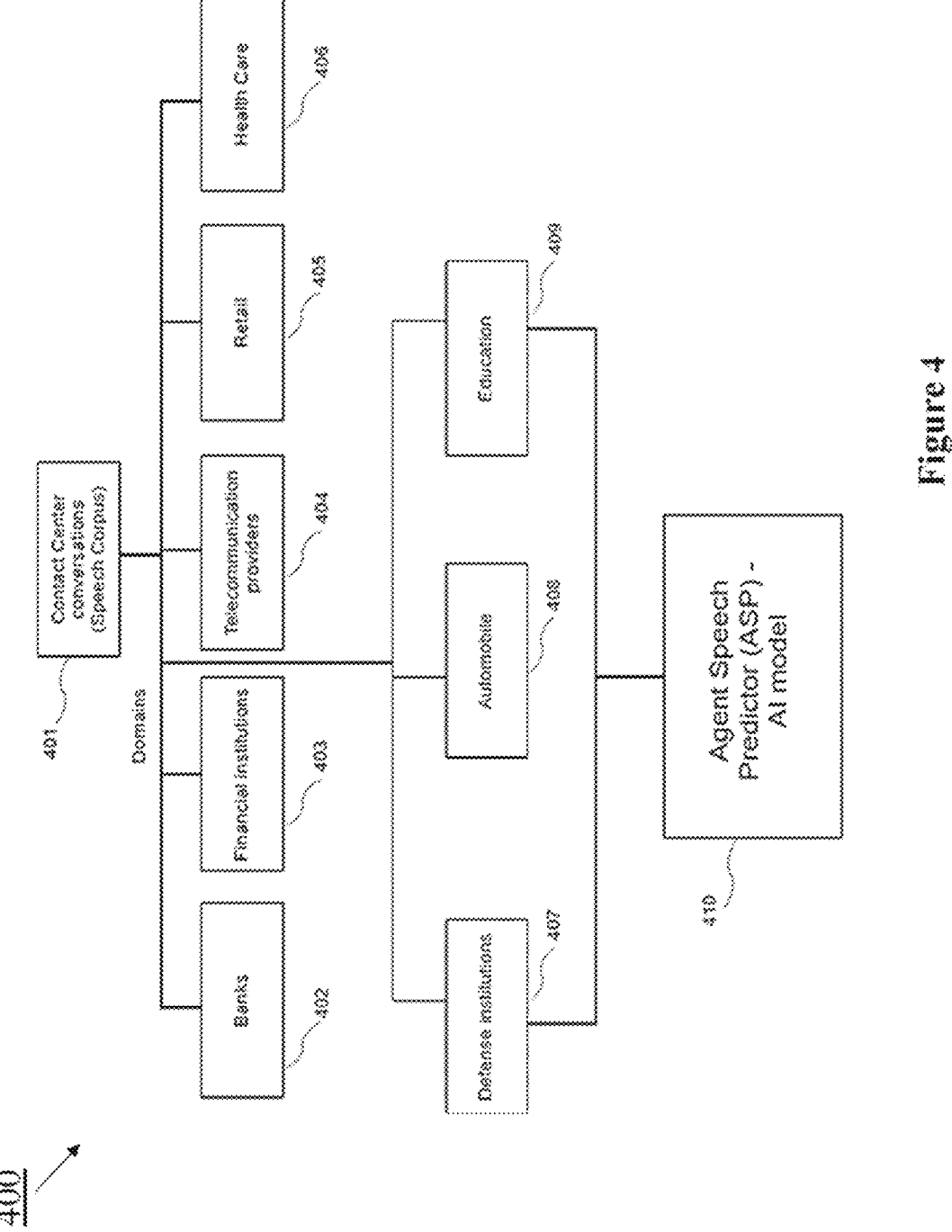
FIG. 4 schematically illustrates a high-level diagram of Agent Speech Predictor (ASP) model training, in accordance with some embodiments of the present disclosure.

According to some embodiments of the present disclosure, the ASP engine may be an Artificial Intelligence (AI) model that may be trained to predict the remaining portion of the agent speech based on speech corpus having customer-agent interactions of contact center companies from different domains, for example, as shown in FIG. 4.

According to some embodiments of the present disclosure, the conflict-detector module 120 may operate a sentiment analysis on the customer-transcript segments and the agent-transcript segments by operating a sentiment analyzer, and then detect the conversational-cut when the predicted remaining portion of agent speech is greater than a preconfigured threshold. The related agent-transcript segments and predicted agent-transcript segments may be stored in a database after the conversational-cut has been detected.

According to some embodiments of the present disclosure, the sentiment analyzer may operate the sentiment analysis on the customer-transcript segments to yield a customer sentiment. The customer sentiment may be one of: positive, negative and neutral. When the yielded customer sentiment is negative the sentiment analyzer may compare the customer-transcript segments with the agent-transcript segments and the predicted agent-transcript segments to determine level of usefulness of the agent's response to the customer's query and thereby determine a level of genuineness of the customer's negative sentiment. The level of genuineness of the customer sentiment would be inversely proportional to the level of usefulness of the agent's spoken plus predicted response i.e., lesser useful the agent's spoken plus predicted response is, the higher would be the genuineness of the customer's negative sentiment. A weight that may be associated to the conversational-cut may be updated based on the determined level of genuineness. For example, when the level of genuineness may be above a preconfigured threshold, it may indicate that the sentiment may be useful, and the weight of the conversational-cut may be increased.

According to some embodiments of the present disclosure, one example of level of genuineness may be Customer Question: "I recently purchased a laptop from your store, but it's not turning on. What should I do?"
Agent Response: "I'm sorry to hear that you're having trouble with your new laptop. Please try the following steps: Ensure the laptop is plugged into a power source. Check if the power adapter is securely connected to both the laptop and the power outlet. Press and hold the power button for 10 seconds to see if it turns on. If these steps don't work, please bring the laptop to our store, and we'll be happy to assist you further.

According to some embodiments of the present disclosure, another example of level of genuineness may be, Customer Question: "I recently purchased a laptop from your store, but it's not turning on. What should I do?"
Agent Response: "Thank you for contacting us. Our store is open from 9 AM to 9 PM every day. We also have a wide range of accessories for laptops. Have a great day!"

According to some embodiments of the present disclosure, stream agent speech via a first Real-time Transport Protocol (RTP) port and streaming customer speech via a second RTP port and then extract audio data from the first RTP port and the second RTP port and transcoding the extracted audio data into linear samples in floating point format.

According to some embodiments of the present disclosure, the voice analyzer may organize the linear samples into an audio-frames sequence and remove noise audio-frames from the audio-frames sequence. Then, each start of sentence in a customer speech and in an agent speech may be detected by operating a pattern recognizer and then, detecting if the agent was still speaking when the customer started to speak and if the agent stopped speaking after the customer started to speak.

According to some embodiments of the present disclosure, the voice analyzer may detect each start of sentence by marking of a timestamp of a first voice audio-frame as a start of sentence. The marking of the timestamp may be performed by operating a pattern recognizer. The pattern recognizer may process a set of instructions for each pattern of audio-frames in category silence and audio frames in category voice in the audio-frames sequence to detect a start of sentence timestamp.

According to some embodiments of the present disclosure, the voice analyzer may further identify a category of the audio-frame as one of: a. silent; b. voice; and c. noise. The voice analyzer may identify the category of the audio-frame by estimating amount of energy in each audio-frame in the audio-frames by operating a time domain analysis.

The audio-frame may be identified as silent when the estimated amount of energy is less than a preconfigured dynamic-threshold.

According to some embodiments of the present disclosure, the voice analyzer may detect if the agent stopped speaking after the customer interrupted the agent and started to speak while the agent was speaking, by checking if there were no voice audio-frames of the agent with marked timestamp in a preconfigured time-distance to the marked timestamp of the voice audio-frames denoting start of the interrupted sentence of the customer.

According to some embodiments of the present disclosure, the SR engine may listen to the first RTP port to generate real-time agent-transcripts and listening to the second RTP port to generate real-time customer-transcripts. The transcript analyzer may extract from the real-time transcripts of the customer, customer-transcript segments, based on the interruption related timestamp and then extract from the real-time transcripts of the agent, agent-transcript segments, based the interruption related timestamp.

FIG. 2 is a high-level workflow of a computerized-method 200 for identifying and addressing a real-time conversational conflict in a contact center, in accordance with some embodiments of the present disclosure.

According to some embodiments of the present disclosure, operation 210 comprising monitoring by one or more processors an interaction between an agent and a customer.

According to some embodiments of the present disclosure, operation 220 comprising continuously updating a conflict-score during the interaction when a conversational-cut is detected, by operating by the one or more processors a conflict-detector module. The conversational-cut is a point in the interaction that the agent speech is interrupted by the customer and the agent stops speaking.

According to some embodiments of the present disclosure, operation 230 comprising addressing the real-time conversational conflict when the updated conflict-score is above a preconfigured conflict-threshold by routing the interaction to a queue of Subject Matter Experts (SME)s of an Automatic Calls Distributor (ACD) application.

FIG. 3 schematically illustrates a high-level diagram of a system 300 for identifying and addressing a real-time conversational conflict in a contact center, in accordance with some embodiments of the present disclosure.

According to some embodiments of the present disclosure, a system, such as system 300 and such as system 100 in FIG. 1, may measure conversational-cuts in a conversation 303, e.g., each interaction in the contact center, by operating an Agent Speech Predictor (ASP) AI model 310, which may take the partial agent speech as input and predict the remaining portion of agent speech. The remaining portion of agent speech may be one or more phrases or sentences. The partial agent speech is taken from the time the agent started the last sentence till the time the customer interrupted, e.g., conversational-cut the agent thereby not letting the agent finish what the agent was trying to convey. The ASP AI model 310 may be trained on domain-based contact center speech corpus.

According to some embodiments of the present disclosure, existing sentiment analysis methods only measure the customer's speech or transcript to identify the sentiment. Sentiment analyzer 309 use existing sentiment analysis method for initial measure of customer sentiment, but also adds the agent's predicted transcript and its usefulness into consideration when updating a conflict score and compares it with customer's concern to measure the 'genuineness' of the customer sentiment. For example, existing sentiment analysis methods as described in U.S. Pat. No. 9,208,502 B2 'Sentiment Analysis' of Jan. 19, 2012, and U.S. Pat. No. 8,463,595 B1 'Detailed Sentiment Analysis' of Jun. 28, 2012.

According to some embodiments of the present disclosure, the sentiment analyzer 309 may be added another dimension of an indication as to the usefulness of the sentiment that has been analyzed when it is a negative one. The agent's spoken part may be taken and the predicted portion of agent speech, which has been predicted by the ASP model 310 and comparing the 'usefulness' of the agent response in the context of the customer's concern.

According to some embodiments of the present disclosure, the customer's concern is taken from the customer transcript segment containing previous one or two sentences till the current sentence with which the customer interrupted the agent. When the agent's predicted response part was supposed to be useful to the customer's concern, it means that the situation can still be controlled by the agent and that there is a possibility that conflict may be reduced once the customer pauses and hears out the agent.

According to some embodiments of the present disclosure, the CUT_weight may be increased by a lesser factor 'w2'. When the agent's predicted response part was supposed to be not useful to the customer's concern, it means that the situation can go out of hand shortly. Therefore, the CUT_weight may be increased by a higher factor 'w3'. Increase in CUT_weight results in increase of the conflict_score which is measured as the function of the number of CUTs found in the real-time conversation and the overall CUT_weight of the conversation.

According to some embodiments of the present disclosure, in a system, such as system 100 in FIG. 1, a hierarchical router 312 may be operated to route conflict-ridden calls to a second queue via the ACD application and may search for resources with higher skillsets to handle the customer. These resources may be SMEs, which may login to a dedicated skill, e.g., a higher skill. These SMEs may login via a UI and may be available for assistance in a higher skill as they login to their skill to receive calls.

According to some embodiments of the present disclosure, a customer 301 in a contact center may be engaged in a real-time conversation 303 with a contact center agent 302. A conflict-detector module, such as conflict detector 305, and such as conflict-detector module 120 in FIG. 1 may continuously monitor the real-time conversation via connection 304.

According to some embodiments of the present disclosure, the conflict detector 305 may identify conflicts in a real-time conversation 303 by determining number of conversational-cuts in the conversation 303. The conflict detector 305 may continuously update a conflict-score during the conversation 303 when a conversational-cut is detected.

According to some embodiments of the present disclosure, conflict detector 305 may analyze the conversational-cuts and assign a weight to each identified conversational-cut. When the updated conflict-score may be above a preconfigured conflict-threshold the real-time conversational conflict may be addressed by routing the conversation 303 to a queue of Subject Matter Experts (SME)s of an Automatic Calls Distributor (ACD) application, such as ACD 140. Supervisors, managers, superiors, and senior agents may be considered as SMEs as the hierarchy may be configured in the hierarchy router 312 in the contact center.

According to some embodiments of the present disclosure, the conflict detector 305 may include voice analyzer 306, Speech Recognition (SR) 307, transaction analyzer 308, sentiment analyzer 309, and Agent Speech Predictor (ASP) 310.

According to some embodiments of the present disclosure, the SR engine 307 may generate real-time transcripts of customer and agent speech during the conversation 303.

According to some embodiments of the present disclosure, the voice analyzer 306 may separate agent and customer speech streams and maintain it in its buffer. The customer voice stream may be on a different RTP port than the agent, so based on the port, the voice analyzer 306 may distinguish which RTP stream belongs to customer speech, and which one belongs to agent speech.

According to some embodiments of the present disclosure, for the separated customer and agent speech streams, the voice analyzer 306 may perform the following audio analysis. The audio analysis may be extracted from incoming RTP packets and transcoded into linear samples, for example, into 8 KHz 32-bit floating point format for better accuracy of the audio analysis.

According to some embodiments of the present disclosure, the linear samples may be organized into an audio-frames sequence for analysis. Once the required audio data for a frame is collected, simple time domain analysis may be performed to estimate the amount of energy in the audio frame. Each frame may be processed for identifying one of the three categories: 'silent', 'voice' and 'noise'.

According to some embodiments of the present disclosure, when the estimated energy is less than a configurable dynamic threshold, then the frame may be categorized as 'silent' without further analysis.

According to some embodiments of the present disclosure, when the estimated energy may be greater than the configurable threshold, then the frame may be further processed to determine it in category 'voice' or 'noise'. Existing tools that determine the category of frame as noise, silence and voice may be for example, Praat, Audacity, Wavesurfer, OpenSMILE and Kaldi.

According to some embodiments of the present disclosure, when 'noise frames may be identified, they may be removed from the frame sequence for analysis. The 'silent' and 'voice' frames may be organized in a sequence in time domain for further analysis.

According to some embodiments of the present disclosure, the voice analyzer 306 may detect the start of each sentence timestamp in customer speech and in agent speech. Each time a customer begins a sentence, it may be marked as timestamp Ti. Each time an agent begins a sentence it may be marked as timestamp Tj.

According to some embodiments of the present disclosure, in speech analysis systems, the audio stream is categorized into frames of equal size. The frame size can be sample-based or time-based and it is determined based on the need of the application. Frame size of 20 ms or 40 ms are most common in real-time applications. The determining of the start of the new sentence may be consider for example, that the frame size is configured to 20 ms. The pattern analyzer for the new sentence may search for a bulk of 'voice' frames of 1500 ms or more, which means a bulk of 20 ms voice frames till that it sums 1500 ms or more in the time-domain, without a significant silence in between. Accordingly, it may search for a series of at least 75 frames of 20 ms each, such that 75*20 ms=1500 ms to recognize that the customer has started speaking. The number of 'silence' frames that may be ignored may be configurable. For example, '0' frames of 'silence' more than 200 ms, i.e., 10 frames in between two consecutive 'voice' frames.

According to some embodiments of the present disclosure, a pattern recognizer for start of a sentence may process a set of instructions to match specific pattern found in a series of audio-frame categorizations. The set of instructions may be configured, for example, such that if a sequence or a bulk of 'voice' frames worth 1500 ms or more may be observed after a sequence of 'silent' frames worth of 1100 ms or more, then it means that a new sentence has started.

According to some embodiments of the present disclosure, observing 'silent' frames worth 1100 ms or more may be based on general observation that humans take a pause of at least 1100 ms before starting a new sentence. This parameter, e.g., Silent_Min, may be configurable.

According to some embodiments of the present disclosure, observing 'voice' frames worth 1500 ms or more after 'silent' frames may be performed to confirm that the customer is indeed continuing to speak a new sentence. If it is a new sentence, then there should be at least 1500 ms worth of 'voice' heard, or otherwise it may not be considered a new sentence. This parameter, e.g., Voice_Min, may be configurable.

According to some embodiments of the present disclosure, when 'silent' frames which worthe1100 ms are followed by 'voice' frames which worth 1500 ms, may be detected matching the above pattern, the voice analyzer 306 may mark the timestamp of the first 'voice' frame within this pattern match as start of a sentence, and the timestamp may be T1, which may indicate the time when the first sentence started in the speech stream.

According to some embodiments of the present disclosure, the pattern recognizer may then move on to find the next pattern match for start of a sentence, which may be the next new sentence. When it finds the pattern of SILENT frames of 1100 ms or more followed by the next set of VOICE frames of 1500 ms or more, the voice analyzer 306 may mark the timestamp of the first 'voice' frame within this pattern match, and the timestamp may be T2, which denotes the time when the second sentence started in the speech stream.

According to some embodiments of the present disclosure, for each start of a sentence in customer speech and agent speech stream, timestamps may be marked and captured. The start of sentence timestamps in customer speech may be marked as Ti, such that if the customer has spoken 'n' sentences in the real-time conversation 303, then i=1 to n. The start of sentence timestamps in customer speech may be marked as Tj, such that if the agent has spoken 'm' sentences in the real-time conversation 303, then j=1 to m.

According to some embodiments of the present disclosure, the voice analyzer 306 may further detect whether the agent was speaking or not when the customer started the sentence. It may detect if the agent was speaking by checking agent voice frames in agent speech for a preconfigured length just before time Ti which is the time the customer started speaking the new sentence. The voice analyzer 306 may identify if there were 'continuous' agent voice frames or not in agent speech when the customer started his new sentence at Ti.

According to some embodiments of the present disclosure, a pattern recognizer for identifying 'continuous' voice frames may check for 'voice' and 'silent' frames in agent speech, but it may use a configurable milliseconds (ms) value only for 'silent' frames. The millisecond value for 'silent' frames may be for example, 500 ms. It may check for 'voice' frames and 'silent' frames for a short duration just before Ti. If there are no consecutive 'silent' frames exceeding 500 ms, then it may classify the agent speech as 'talking' just before the time the customer started the sentence at Ti. It then may classify the customer's start of sentence at Ti as an 'interruption' because the agent was talking at that time.

According to some embodiments of the present disclosure, the voice analyzer 306 may further detect whether the agent stopped speaking when the customer started a new sentence at Ti by using a pattern recognizer. The agent speech may be checked for a pre-configured duration just after Ti, to detect 'continuous' voice frames in agent speech beyond the preconfigured length based on a configurable parameter. If there were continuous voice frames beyond the preconfigured length after the customer started the sentence at Ti, then it may indicate that the agent was 'talking-over' and that there was no conversational-cut that is related to the real-time conversational conflict.

According to some embodiments of the present disclosure, when continuous agent voice frames were not detected after Ti for the preconfigured length, it may indicate that the agent stopped speaking within a short duration once the customer started the sentence, which may be related to the conversational-cut and a real-time conversational conflict.

According to some embodiments of the present disclosure, the SR engine 307 may generate real-time transcripts of customer and agent speech. The SR engine 307 may listen to the customer speech and agent speech stream of the real-time conversation 303 and generate real-time transcripts.

According to some embodiments of the present disclosure, the SR engine 307 may be an existing SR software for speech recognition, such as Nuance® Automatic Speech Recognition (ASR), that operates on various inbound and outbound call flows. For example, the SR engine is used to capture customer's spoken response on IVR menu on inbound calls, to capture customer's spoken response by voice-bots or virtual agent scripts on outbound sales calls, to capture customer feedback of the service provided by the company towards the end of a call etc.

According to some embodiments of the present disclosure, the existing SR software may be leveraged to operate as the SR engine 307 to generate real-time transcripts of agent and customer speech during the real-time conversation.

According to some embodiments of the present disclosure, the transcript analyzer 308 may check the customer and agent transcripts of the real-time conversation generated by the SR engine 307. Then, it my pick certain key segments of the transcript based on timing and may keep it in a buffer for detailed analysis. It may provide these transcript segments as inputs to the ASP model 310 and the sentiment analyzer 309.

According to some embodiments of the present disclosure, the sentiment analyzer 3009 may take the customer transcript segments from the buffer of the transcript analyzer 308 and may perform a sentiment analysis and a comparison of the customer transcript segment with the agent's segment, e.g., spoken plus predicted to determine whether the agent's response would have been useful to the customer's concern or not. Based on this determination of usefulness, it may determine the 'genuineness' of the customer sentiment and accordingly updates the weight of the conversational-cut.

According to some embodiments of the present disclosure, the ASP module 310 may be implemented as an AI model which may be pretrained based on contact center speech corpus, i.e., multitude of agent-customer conversations in the contact center. The speech corpus that would serve as input to train the AI model may include conversations of contact center companies belonging to 'different domains'. For example, as shown in FIG. 4

According to some embodiments of the present disclosure, the trained ASP model 310 may be used to predict what the agent "was going to speak" each time when the customer 'CUT' the agent during the real-time conversation, e.g., conversational-cut and send the 'predicted portion' of agent transcript to the conflict detector 305.

According to some embodiments of the present disclosure, the conflict detector 305 may use the voice analyzer 306, the SR engine 307, the transcript analyzer 308, the sentiment analyzer 309 and the ASP model 310 to determine the number of conversational-cuts, assign weight to each conversational-cut and update the conflict score during the real time conversation 303.

According to some embodiments of the present disclosure, when the conflict-score of the real-time conversation 303 may exceed a preconfigured threshold 311, then the conflict detector 305 may send the details of the conversation 303 to a 'hierarchical router' 312, which is a component that may route the conversation to a next level queue that is associated with SMEs.

FIG. 4 schematically illustrates a high-level diagram of Agent Speech Predictor (ASP) model training 400, in accordance with some embodiments of the present disclosure.

According to some embodiments of the present disclosure, different domains of contact center companies may be for example, banks 402, financial institutions 403, telecommunication providers 404, retail sector companies 405, healthcare companies, defense institutions 407, automobile companies 408 and educational institutes 409.

According to some embodiments of the present disclosure, the speech corpus source for the training of the AI model, such as ASP module 310 in FIG. 3. Companies which are running the contact center would have a repository of voice recordings of multiple agent-customer interactions. All contact centers must follow compliance regulations and quality checks, so they have internal or third-party recorders which integrate with their software and record partial or all agent-customer interactions which are conducted through the day. There is also a policy to maintain each recording for a particular time-period since it was created, such as 90 days, before purging it. At any given point, contact centers would have large number of agent-customer interaction recordings. The contact centers can leverage these recordings to train the ASP model, such as ASP model 310 in FIG. 3.

FIG. 5 shows a graph 500 illustrating a conversational-cut, in accordance with some embodiments of the present disclosure.

According to some embodiments of the present disclosure, a conversational-cut is a point in an interaction that the agent speech is interrupted by the customer and the agent stops speaking. It is the moment when the agent has not completed the sentence, but the customer interrupts because the customer is in complaining mode and the agent stops speaking almost as soon as customer interrupts the agent.

According to some embodiments of the present disclosure, the real-time conversation conflict may constitute several conversational-cuts. The conversational-cuts may happen as the customer may keep "cutting" the agent several times during the conversation, trying to overpower the conversation out of dissatisfaction or frustration or any other reason.

According to some embodiments of the present disclosure, conversational-cuts are different than talk-overs. Talk-overs or cross-talks happen when both agent and customer speak over each other simultaneously, when both parties want to make their point. There are existing methods to analyze and handle talk-over/cross-talk. Talk-overs are also referred to as 'overlaps' in some portions of this draft.

According to some embodiments of the present disclosure, measuring conversational-cuts may indicate the real-time conversational conflict in the contact center better than talk-overs because contact center agents are trained to not speak over the customer when the customer interrupts and starts talking. Therefore, in contact centers, there is a higher volume of conversational-cuts during the conversations rather than 'talk-overs/cross-talks/overlaps'. Most of conflict-ridden conversations have conversational-cuts in them, and very few may have talk-overs. Therefore, talk-overs detection may not fit as an indication for real-time conversational conflict in a contact center conversation.

According to some embodiments of the present disclosure, the conflict detector module, such as conflict detector module 305 in FIG. 3 and such as conflict-detector module 120 in FIG. 1 may detect and updates the number of CUTs in the real-time conversation. It uses an Agent Speech Predictor (ASP) model, such as ASP model 310 in FIG. 3 which is pretrained based on domain specific contact center conversations. The ASP model takes the incomplete speech of the agent at the time of interruption and produces as output the predicted portion of agent speech. If the predicted portion of agent speech is greater than a preconfigured threshold, then the conflict detector module may flag that particular interruption as a conversational-cut and may update the conflict score.

According to some embodiments of the present disclosure, a sentiment analysis may be operated on the customer-transcript segments of the real-time interaction, such as conversation 303 in FIG. 3, to yield a customer sentiment, When the yielded customer sentiment is negative the level of 'genuineness' of the customer's sentiment may be checked. When the level of genuineness of the customer sentiment is above a preconfigured threshold the weight that is associated to the conversational-cut may be updated.

According to some embodiments of the present disclosure, the weight, e.g., CUT_weight may be a fraction or integer. For example, weight can be assigned in multiples of 0.25. The default CUT_weight may be 0.25, i.e., if the customer has interrupted the agent with a neutral sentiment, as shown in step 628 in FIG. 6. When customer has interrupted the agent with a negative sentiment, then the CUT_weight may be set to 0.75.

According to some embodiments of the present disclosure, in another example, when the agent's predicted response was seen to be very useful, the CUT_weight may not be increased more than the default value. When the agent response was somewhat useful but not as much, the CUT_weight may be increased to 0.5, as shown in step 633 in FIG. 6. When the agent response was useless, the CUT_weight may be increased to 1.0, as shown in step 632 in FIG. 6.

According to some embodiments of the present disclosure, the conflict detector may calculate the conflict-score of the ongoing real-time conversation as a function of the number of conversational-cuts and the cumulative CUT_weight of the conversational conflict till current time. Meaning, the conflict detector may continuously calculate and update the conflict-score during the interaction.

FIGS. 6A-6E show a high-level workflow of a conflict detector module 600, in accordance with some embodiments of the present disclosure.

According to some embodiments of the present disclosure, the conflict detector 600 may operate in a system, such as system 100 in FIG. 1, and such as system 300 in FIG. 3.

According to some embodiments of the present disclosure, during a real-time voice conversation 601 between the customer and agent in a contact center, such as conversation 303 in FIG. 3, the audio-data of the conversation may be forwarded to a voice analyzer 602, such as voice analyzer 306 in FIG. 3 and to an SR engine 603, such as SR engine 307 in FIG. 3.

According to some embodiments of the present disclosure, the SR engine 603 may continuously generate real-time transcripts of the conversation. The SR engine 603 may implement Sentence Boundary Detector (SBD) methods to identify and mark the start and completion of sentences in the conversation 601. The SR engine 603 may also separate the customer transcript vs agent transcript and mark the timing of each start and end of sentence in both the customer transcript and the agent transcript. The separated customer transcript and agent transcript may be stored with marked timings in a buffer or any other form of data storage 605.

According to some embodiments of the present disclosure, the voice analyzer 602 may receive the voice input of the conversation and based on Real-Time Transport protocol (RTP) ports for customer vs agent, the voice analyzer 602 may separate the customer voice-stream vs the agent voice-stream and continuously store the separated voice streams in time domain for further analysis. The voice streams may be stored in a buffer or any other form of data storage.

According to some embodiments of the present disclosure, the voice analyzer 602 may analyze the voice frames in the customer stream and in the agent stream to detect the timestamp of start of each new sentence in customer speech and agent speech.

According to some embodiments of the present disclosure, the voice analyzer 602 may generate outputs which may be an array of Ti and Tj, where Ti denotes the timestamp of the beginning of each new sentence in customer speech 606, and Tj denotes the timestamp of the beginning of each new sentence in agent speech 607.

According to some embodiments of the present disclosure, for each timestamp Ti 608 may start a loop of a continuous process of a set of instructions for each timestamp Ti found in the real-time conversation, i.e., it runs for each time customer begins talking a new sentence or phrase.

According to some embodiments of the present disclosure, the voice analyzer 602 may analyze agent speech stream around current Ti 609. Ti is when the customer started speaking a new sentence. The analyzing of agent voice frames 'around' Ti, means is that it analyzes agent voice frames for small durations 'just before' and 'just after' timestamp Ti for a preconfigured lengths of time.

According to some embodiments of the present disclosure, the voice analyzer 602 has been continuously listening to the real-time conversation, separating the customer and agent voice streams, and storing in a buffer or storage at 604. The voice analyzer may look for time Ti in the stored agent speech stream and then analyze the voice frames in the agent speech stream at around time Ti.

According to some embodiments of the present disclosure, while analyzing agent voice frames 'just before' time Ti, the voice analyzer may check whether there were 'continuous' agent voice frames just before time Ti for at-least a minimum preconfigured length of time. For example, the configurable parameter i.e., 'min_prev', when it may be set, for example, to 6000 ms, then it would check if there were continuous agent voice frames for at least 6000 ms just before time Ti.

According to some embodiments of the present disclosure, 'silent' frames in between the 'voice' frames may be ignored. That is, there should be lesser than a configured pause length which is considered ignorable. For example, the configurable pause length parameter may be 'pause_ignore' and it may be set to 500 ms.

According to some embodiments of the present disclosure, to verify that there were continuous agent voice frames just before Ti for a length of time defined in min_prev e.g., 6000 ms, the voice analyzer may check the agent speech stream from the time Ti—6000 ms to time Ti. Within this duration of 6 secs, if it finds 'voice' frames and 'silent' frames, such that the 'silent' frames in between two consecutive 'voice' frames are no greater than 500 ms, then it may determine this agent speech stream as 'continuous' voice, as part of its analysis just before time Ti.

According to some embodiments of the present disclosure, the 'continuous' voice of agent speech stream, means that the agent was continuously talking, with natural small pauses in between words, but no pauses big enough indicating that the agent has stopped the phrase or sentence. This would also mean that the agent was continuously talking in a situation where it is detected that the customer started speaking a new sentence at time Ti. In this case, the instance would be considered as an 'interruption' by the customer, e.g., conversational-cut.

According to some embodiments of the present disclosure, when the analysis of agent speech stream 609 determines that the agent was speaking at Ti when the customer started a sentence 610, there were continuous agent voice frames just before Ti and an 'interruption' was detected, the conflict detector may check if the agent stopped speaking at Ti when the customer has interrupted 612 by operating the voice analyzer module.

According to some embodiments of the present disclosure, when the analysis of the agent speech stream yields that the agent voice stream was not qualified as 'continuous' for 'min_prev' length of time before Ti, then it means that the customer spoke after the agent had already paused the phrase or sentence, and it may be not considered as an interruption since it may be considered as a proper start of sentence by the customer after the agent paused or stopped speaking and step 608 may be repeated.

According to some embodiments of the present disclosure, when an interruption, e.g., conversational-cut has been detected then the conflict detector module may operate the voice analyzer to check if the agent has stopped speaking at Ti, when the customer has interrupted 612, which is the 'just after' Ti analysis of agent speech steam.

According to some embodiments of the present disclosure, when the conflict detector module 600 may operate the voice analyzer to check the "just after" analysis of 609 to determine whether the agent stopped speaking at timestamp Ti, it does not mean that the agent has to exactly stopped speaking at or before Ti and that no agent voice frames should be seen immediately after Ti. In a real conversation, when another party speaks, the first party may take few secs to realize that the other party wants to make a point and thereby decide to stop speaking. So, there can always be small 'natural' overlaps, e.g., talk-overs in the conversation which are acceptable. These small overlaps may be ignored because they are not real conversational-cut which may indicate a conversational conflict, where both parties are fighting and talking over each other.

According to some embodiments of the present disclosure, in order to determine whether there was a conversational-cut, the voice analyzer module may use a configurable parameter, e.g., 'min_next', which specifies the length of time in which the agent voice frames may be checked just after Ti. For example, 'min_next' may be configured to 8000 ms. In this case, if it finds 'continuous' agent 'voice' frames from time Ti to Ti+8000 ms and beyond, then it may conclude that the agent is talking-over the customer and may classify it as a real 'overlap' or 'talk-over', to which existing methods to handle talk-over or overlap situations 613 may handle.

According to some embodiments of the present disclosure, when it does not find continuous agent 'voice' frames in the duration from time Ti to Ti+8000 ms, then it means that there are 'silent' frames exceeding the length of the ignorable pause which was preconfigured in the parameter 'pause_ignore'. It may indicate that the agent paused shortly after the customer started speaking and may be considered that the agent stopped speaking 'just after' Ti, i.e., around the time when the customer started a new sentence, which means a possible conversational-cut.

According to some embodiments of the present disclosure, it has been determined that the agent stopped speaking just at or after Ti i.e., when the customer started a sentence, hence it needs to be determined what the agent 'was going to say' and whether the agent was going to say significant number of words or phrases when the customer interrupted.

According to some embodiments of the present disclosure, the conflict detector 600 may operate transcript analyzer module, which focusses on analyzing the customer and agent transcript segments centered around Ti. The SR engine 603 has been continuously generating transcript of the real-time conversation, which has been separated into customer and agent transcripts and stored in a buffer or any other form of storage as part of 605. The transcript analyzer may use stored transcript for the analysis.

According to some embodiments of the present disclosure, the transcript analyzer may analyze the customer segment 615 of the transcript which has been separated and stored by the SR engine, by looking for transcript segment from Ti, e.g., start of customer sentence till the customer completes the sentence or phrase. If the customer is still speaking at the time, it may have to wait till the customer finishes the sentence and till the SR engine stores it in a buffer.

According to some embodiments of the present disclosure, the SR engine may implement basic Sentence Boundary Detector (SBD) methods to identify the start and completion of a sentence. Also, the SR engine has marked the start and end of each customer and agent sentence. Once the sentence is completed, marked at Tk timestamp the transcript analyzer may pick up this customer transcript segment from time Ti to Tk and may store it in an associated buffer, which is a buffer that is maintained by the transcript analyzer.

According to some embodiments of the present disclosure, the customer transcript segment from Ti to Tk may be referred as 'c_segment1'. The transcript analyzer may also look for and save another longer segment containing one previous sentence of the customer plus the current sentence, i.e., two sentences. Considering that the previous sentence has started at Ti-1, the transcript analyzer may save the customer transcript segment from Ti-1 to Tk as 'c_segment2'. The 'c_segment2' may be used in step 630.

After saving 'c_segment1' and 'c_segment2', conflict detector module 600 may wait for conversational-cut determination by step 617.

According to some embodiments of the present disclosure, for 'c_segment2', one previous sentence before Ti plus the current sentence, Ti to Tk is the default configuration. The number of previous sentences that it can take may be configurable, for example, if configured to '2', the c_segment2 would take two previous sentences before Ti along with the current sentence from Ti to Tk. The parameter c_segment2 is shown as taking just one previous sentence only for example illustration, one previous sentence may be the default.

According to some embodiments of the present disclosure, the transcript analyzer may also analyze the agent transcript centered around Ti. Ti is the time when the customer had just started speaking a new sentence. For agent speech it needs to go back and check what the agent has said before the customer interrupted at Ti. It needs to specifically go back to the time when the agent had started the new sentence before time Ti. The start sentences of the agent have been tracked at step 607 as Tj. From step 607, the transcript analyzer may take the closest Tj before the current Ti. Then, it may take the agent transcript segment from Tj to Ti and may store it in the associated buffer. This agent transcript segment is named as 'a_segment' and it may be sent as input to the 'Agent Speech Predictor (ASP)' AI model 619. The ASP module may predict the remaining portion of agent speech based on the a_segment input.

According to some embodiments of the present disclosure, the ASP module may be a pretrained AI module 618, as shown in FIG. 4.

According to some embodiments of the present disclosure, the ASP module, based on the agent transcript segment input that it got in step 616, may predict the remaining portion of agent speech at 619. This is the remaining portion that the agent 'was going to speak' when the customer interrupted the agent.

According to some embodiments of the present disclosure, the remaining portion of the agent speech predicted by the ASP module may be a group of phrases or one or more sentences. When an agent may speak on a topic or answer a customer query, it is not necessary that the agent will be able to finish in just one phrase or sentence. The ASP AI model 619 may predict, based on the context of conversation and the agent input transcript 'a_segment' that it received, the portion that the agent was intending to say but was not able to due to customer interruption.

According to some embodiments of the present disclosure, once the remaining portion of agent speech is predicted, at 620 it would store the predicted portion in buffer or any form of storage and measure the length of the 'predicted' portion of the transcript. The length may be measured in the form of number of words. If there are several sentences in the predicted portion, it would count the words across all sentences. At 621, it would compare this measured length of predicted portion with a minimum threshold for deciding whether the interruption was a 'CUT'. This minimum threshold would be a configurable parameter called 'cut_min'.

According to some embodiments of the present disclosure, for example, when the 'cut_min' may be configured to 15 words for a particular business case so when the length of the predicted portion of agent speech is greater than 15 words, e.g., 28 words, then it means there was a significant portion that the agent 'was going to speak' to convey the answer, but the customer interrupted due to which the agent has stopped talking. In such a scenario, interruption instance may be determined and marked as conversational-cut and conflict detector may wait for CUT result 617 which means that it is waiting to receive a CUT signal, if any. The CUT signal indicates that the updated conflict-score is above a preconfigured conflict-threshold and the real-time conversational conflict should be addressed.

According to some embodiments of the present disclosure, when the length of the predicted potion of agent speech is lesser than the configured 'cut_min', then the interruption instance would not be considered as a conversational-cuts, because it would mean that the agent did not intend to speak much, and that the customer interrupted 'almost' when the agent had finished making a point. In such a case, next step would be 608, i.e., to the next Ti in the for loop. The next Ti is the timestamp when the customer would start the next sentence in the ongoing real-time conversation.

According to some embodiments of the present disclosure, the parameter of length of the predicted portion such that an interruption, e.g., conversational-cut may be determined may vary by each contact centers, and also within a contact center, it may vary for different businesses and departments. The parameter is therefore kept configurable, and a value could be set by a user as per business need. Once an interruption is determined and marked as a CUT, 624, the transcript of the agent's spoken part Tj to Ti and the predicted part may be stored in a buffer or any form of storage, in a variable named 'agent_sp_segment'. This variable 'agent_sp_segment', which includes the spoken part and the predicted part of agent speech, may be provided as an input to the sentiment analyzer 626, such as sentiment analyzer 309 in FIG. 3.

According to some embodiments of the present disclosure, there are various quality monitoring, analytics, and 3rd party AI tools to measure the quality of agent response to a customer question. It covers various aspects from answering the question with accuracy, subject expertise, providing additional info which may help the customer, soft-skills and more. Similar existing software and tools may be for example Azure AI service of Microsoft® and a natural-language processing (NLP) service that uses machine learning to uncover valuable insights and connections in text such as, Amazon® Comprehend which may be used to determine the 'level of usefulness of agent's response to the customer query.

According to some embodiments of the present disclosure, when the interruption instance may be determined as a 'CUT', e.g., conversational-cut, a conflict-score may be updated, for example, by increasing a parameter called CUT_counter by 1 625. The 'CUT_counter' parameter may be a parameter which may store the number of conversational-cuts found in the real-time conversation, such as real-time conversation 303 in FIG. 3. This parameter may be updated throughout the conversation by the conflict detector module 600.

According to some embodiments of the present disclosure, at first, the sentiment analyzer may analyze customer sentiment based on the input 626 by using existing sentiment analysis methods to identify the sentiment with which the customer interrupted the agent. It may use only 'c_segment1' for the analysis because that is the segment when the customer interrupted the agent. Existing sentiment analysis methods identify the polarity of the overall sentiment conveyed by a particular text. The simplest form of polarity measure is classifying a text into negative, positive, or neutral emotion. In this case the customer transcript segment 'c_segment1', which acts as text input to the sentiment analyzer, may include the sentence that started at Ti and ended at Tk. This sentence may be analyzed, and its polarity may be classified.

According to some embodiments of the present disclosure, the conflict detector 600 may operate the sentiment analyzer to update the CUT_weight for the current instance of conversational conflict, which means the instance measured around the current Ti timestamp when the customer 'CUT' the agent. The CUT_weight for the current Ti may be 'CUT_weight_Ti'.

According to some embodiments of the present disclosure, the sentiment analyzer may check whether there was a negative sentiment in the customer transcript segment 'c_segment1'. If there was a negative sentiment, it would set the CUT_weight_Ti to 'w1' 629, where w1 may be a configurable weight that a user may assign for a negative sentiment found during a conversational-cut.

According to some embodiments of the present disclosure, existing methods of sentiment analysis also implement deeper levels of sentiment classification. Thus, optionally, there may be deeper levels of negative sentiments used in the implementation and weights may be assigned based on the depth of the negative sentiment found with existing methods.

According to some embodiments of the present disclosure, when there was no negative sentiment at the time of the CUT, it would keep the CUT_weight_Ti to the default value 628. The default value may be configurable.

According to some embodiments of the present disclosure, the default value, in any case, should be less than w1, because w1 weight is for negative sentiment. While setting the configuration parameters, such conditional checks for parameter values may be implemented. If default value is set for the CUT_weight_Ti at 628, then step 635 may be operated.

According to some embodiments of the present disclosure, the sentiment analyzer had received, as input another customer transcript segment 'c_segment2'. This contains one previous sentence by its default configuration along with the current sentence, i.e., two sentences, one which started at Ti-1 and another which started at Ti.

According to some embodiments of the present disclosure, the sentiment analyzer also has the agent transcript segment 'agent_sp_segment' from step 624 as input. This is the agent transcript segment containing the partial sentence that the agent spoke before the customer interrupted and the predicted portion by the ASP model. The predicted portion would not only finish the agent's current sentence, but it may also include one or more sentences based on the context and the output generated by the Agent Speech Predictor (ASP) model.

According to some embodiments of the present disclosure, the sentiment analyzer may analyze the 'agent_sp_segment' which is the spoken part and the predicted part, that has been received in step 624 in the context of the customer concern. The customer's concern is taken from the transcript segment 'c_segment2' that it received from step 615.

According to some embodiments of the present disclosure, 'c_segment2' which may include customer sentences starting at Ti-1 and Ti, because it would give a better 'context' of the customer's concern around time Ti may be used to compare with what the agent was saying and going to say at that time: 'agent_sp_segment', i.e., spoken part and predicted part. The 'c_segment_2', by its default configuration may take one previous sentence, but it may include more previous sentences of the customer based on the configuration. The intent to keep one or more previous sentences of the customer in 'c_segment2' is to try and identify the customer's concern around that time while comparing with the agent segment.

According to some embodiments of the present disclosure, using these transcript segments, the sentiment analyzer may determine whether the agent's full answer would eventually be helpful to the customer's concern or not 631. If the agent's answer would be helpful, then it means the customer 'has interrupted before even listening to a useful reply. However, the agent still had a useful reply pertaining to the customer issue which would have helped the customer. In this case, the sentiment analyzer would increase the CUT_weight_Ti by a particular amount 'w2' 633.

According to some embodiments of the present disclosure, in this situation, it is more likely that the customer may hear out the agent's useful reply in the next few secs of the real-time conversation. This situation is therefore less intense than the following situation.

According to some embodiments of the present disclosure, when based on the analysis of the sentiment analyzer, the agent's answer would not have been helpful, then it means that even if the customer would have listened to the agent, the agent's reply would still have not solved the customer's concern. Since this is a worse situation, the sentiment analyzer may increase the CUT_weight_Ti by a larger amount 'w3' 632.

According to some embodiments of the present disclosure, w2 and w3 would be configurable parameters for the user and as w2 is less intense than w3, its value may be lesser than w3. While setting the configuration parameters, such conditional checks for parameter values may be implemented.

According to some embodiments of the present disclosure, by checking whether the agent's answer would have been helpful or not to the customer's concern, the 'genuineness' of the customer's sentiment may be checked in turn to identify whether the customer's sentiment is 'justified'. If the agent does not have a helpful or useful answer to the customer's concern, then the CUT_weight_Ti should increase by a larger amount, e.g., w3, because the need for a SME intervention sooner may be even more essential. Thus, by comparing the customer's concern in the real-time conversation with the agent's partially spoken plus predicted response by ASP, another dimension may be added to the sentiment analysis by bringing in an evaluation of 'genuineness' of the negative sentiment and assigning a CUT_weight based on it.

According to some embodiments of the present disclosure, existing sentiment analysis methods analyze only the customer speech transcript. Conflict detector module 600 may also co-relate the agent's response including predicted one to the customer's concern to determine the genuineness of customer's sentiment. If there is higher genuineness, the sentiment score would increase proportionally. In this case, based on the use case of conventional-cut, the synonymous parameter for sentiment score is the CUT_weight[Ti] which increases by a factor of w2 and w3 if the analyzed predicted agent response is useful vs not useful. Optionally, there could be deeper levels of non-useful and useful measures and weights which may be assigned accordingly.

According to some embodiments of the present disclosure, the sentiment analyzer may update the overall CUT_weight of the conversation 634. It adds the CUT_weight for current instance, i.e., CUT_weight_Ti to the overall CUT_weight of the conversation till now.

According to some embodiments of the present disclosure, when the conflict detector module 600 has already updated the CUT_counter because a CUT was found. The CUT_counter from 625 and the CUT_weight from 634 serve as input to 635, where the conflict detector module 600 may update the overall conflit-score, which would be a function of the overall CUT_counter and the CUT_weight found in the conversation till now.

According to some embodiments of the present disclosure, the conflict detector module 600 may compare the updated conflict score of the real-time conversation with a conflict threshold. The conflict threshold may be a configurable parameter for the user. If the conflict score is within the threshold, then it means the conflict in the real-time conversation has not yet reached the level which needs immediate SME intervention 637 which goes to step 608, i.e., to the next Ti in the for loop to continue its analysis of the real-time conversation.

According to some embodiments of the present disclosure, if the conflict score is above the conflict threshold, then it means immediate assistance is needed on the issue. There is a need to engage an SME. SME can be supervisors, managers, superiors, and even some senior agents in the contact center. The conflict detector module 600 may pass on the conversation details to the 'hierarchical router', as shown in FIG. 7, which may invoke the process to route the call in real-time to a next-level hierarchy queue of SMEs 638.

According to some embodiments of the present disclosure, talk-overs and overlaps may not be considered an interruption or conversational-cut. When talk-overs may be detected, existing methods may be used 613. However, once an overlap may be detected, the existing methods may still utilize the hierarchical router 638. The conflict detector module 600 may be utilized to pass the details of the overlap or talk-over call if based on analysis from existing methods the overlap is considered as a 'conflict' to a hierarchical router 638, which would then route the call to a next-level hierarchy queue of SMEs by utilizing Inbound ACD system capabilities.

Figure 7:
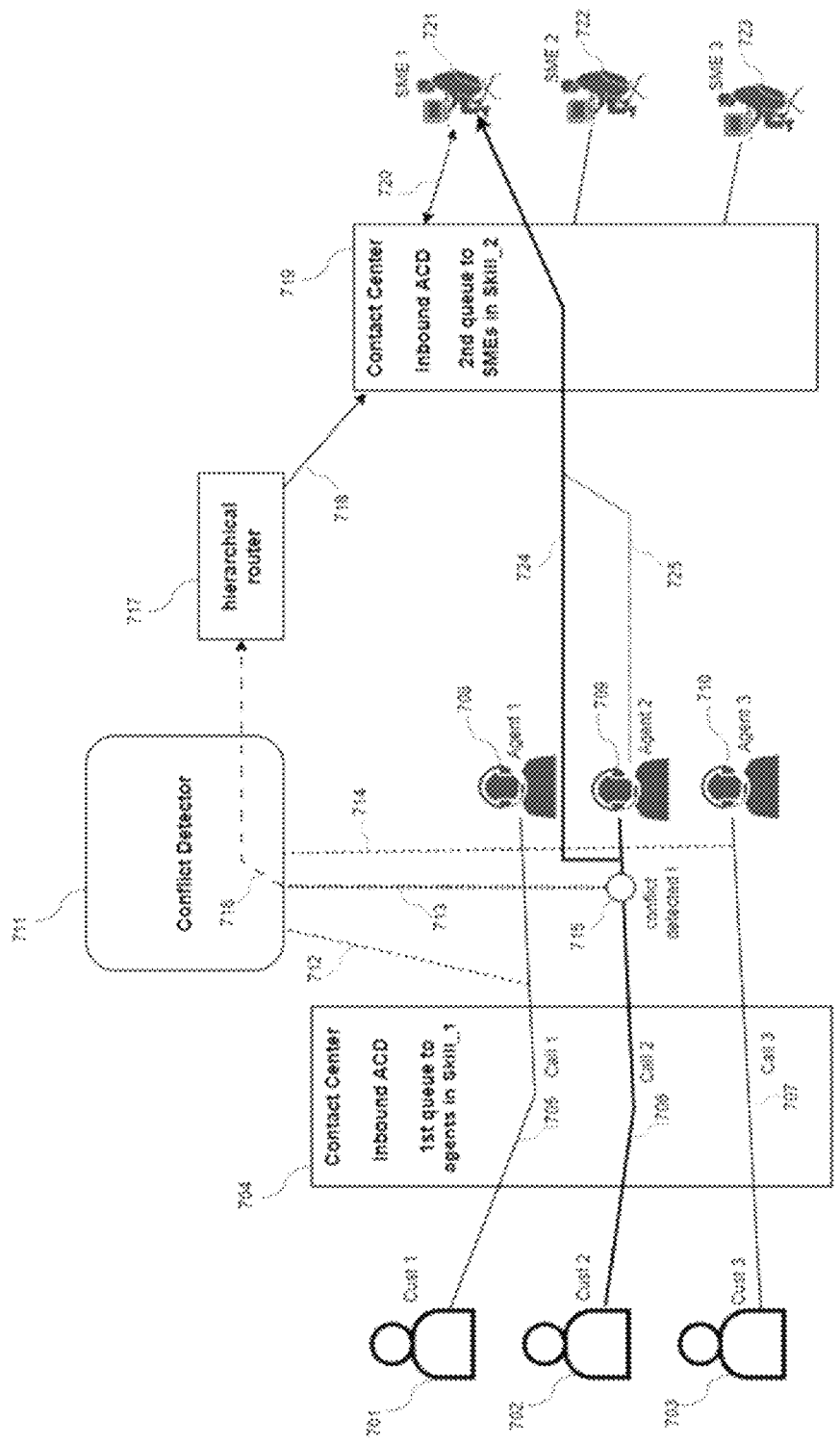
FIG. 7 shows a hierarchical router and real-time conflicted conversation routed to an SME in the contact center, in accordance with some embodiments of the present disclosure.

FIG. 7 shows a hierarchical router and real-time conflicted conversation routed to an SME in the contact center, in accordance with some embodiments of the present disclosure.

According to some embodiments of the present disclosure, incoming calls 705-707 from customers 701-703 may be maintained in a queue of interactions that will be handled by agents having skill_1 which is associated to contact center inbound ACD 704 and from there may be routed to agents having skill_1 708-710 respectively. The conversations 705-707 may be monitored by a conflict detector module 711, such as conflict detector module 600 in FIG. 6 and such as conflict-detector module 120 in FIG. 1. When the conflict detector 711 may identify a real-time conversational conflict during one of the conversations, the conversation details may be routed or added via the hierarchical router 717 to a contact center inbound ACD SME queue 719, such as queue of SME 150 in FIG. 1 for SMEs 721-723 having skill_2.

According to some embodiments of the present disclosure, the contact center inbound ACD 704, such as ACD application 140 in FIG. 1, routes incoming customer calls to agents based on skill matching, agent's availability, last call taken time, agent's customer satisfaction score, agent's area of expertise and other criteria to match an agent with a customer.

According to some embodiments of the present disclosure, when an agent is not immediately available, the call may be maintained in a queue that is associated to the contact center ACD where music or company's product messages may be played, and as soon as an agent becomes available, the customer call is connected to the matched agent. If an agent is already available, the queue time is '0 ' and the customer call is passed through the queue and get out of the queue in 0 time because an agent was available to take the call.

According to some embodiments of the present disclosure, the agents 708-710 are logged-in to the contact center system and belong to skill_1, where skill_1 is the skill needed to handle the incoming customer calls in the queue.

According to some embodiments of the present disclosure, when a customer 701 may call the contact center the call may hit the contact center inbound ACD 704 and forwarded to a queue that maintains interactions for agents having skill_1 among other criteria. From the queue the interaction may be routed to an agent having skill_1. The agent may pick up the routed call and the status of the call is 'connected, and the customer and the agent are in 'talking' state.

According to some embodiments of the present disclosure, when a conflict may be detected by the conflict detector 711 on a call 706 via the monitoring connection 713 the conflict detector 711 may forward the details of the call to a hierarchical router 717 via connection 716. The hierarchical router 717 may not immediately interfere with the call, but it may initiate a new call 718 with the details it got of the conflict-ridden call 706 from the conflict detector via 716.

According to some embodiments of the present disclosure, the new call may be internally generated by the conflict detector 711 on behalf of the agent with an internal end point, e.g., agent's IP phone number as the originating party. The destination party would be a destination endpoint such as a Vector Directory Number (VDN) which hits another inbound ACD 719. This inbound ACD 719 will maintain a second queue to handle conflict-ridden calls and hunt for a different set of agents belonging to another skill 'skill_2', which will be considered as the 'hierarchical' skill. These different set of agents belonging to 'skill_2' would be Subject-Matter-Experts (SMEs) who can assist the customer with their expertise and diffuse the customer temperature, thereby increasing the customer satisfaction score.

According to some embodiments of the present disclosure, the inbound ACD 719 may use existing methods of call routing to find a resource with higher skillset to handle a call, e.g., an agent, which may be an SME with higher skillsets who can help the customer on the conflicted call and solve the customer problem. The SMEs may be supervisors, managers, superiors, and senior agents in the contact center.

According to some embodiments of the present disclosure, when the inbound ACD 719 may identifies SME1 721 as the SME to handle the call the SME1 721 may pick up this new call 718. Once the SME picks this new call, all details of the customer may be received on the CRM screen, as all customer details of this conflicted call 706 have been forwarded earlier by the conflict detector 711 via connection 716 to the hierarchical router. SME1 721 has all customer details on the CRM screen, similar to the original agent 709 who has the customer details on the CRM and is still talking with the customer.

According to some embodiments of the present disclosure, once the SME1 721 answers the internally generated call 718, the hierarchical router 717 may conference the real-time customer call, i.e., call2 706 with call 718. When two SIP calls are conferenced, it means that the RTP voice of the parties associated with those two calls are being shared and that they can listen to each other's voice and speak to each other. Thus, at this point, the voice path is opened between SME1 721, customer 702 and agent 709. The addition of SME1 721 to the conflicted customer call 706 is shown as connection 724. Agent 709 may stay on the call, via connection 725.

According to some embodiments of the present disclosure, agent 709 may remain on the call for some time and decide to drop later once SME1 721 has taken over. The agent may alternatively choose to stay on the call till the full conversation with the customer is completed. That would be depending on the case and business need, and as understood and agreed upon between the customer, SME, and the agent.

According to some embodiments of the present disclosure, there are also existing methods where there are automation and trigger mechanisms that can automatically initiate conference calls on behalf of the agent based on predefined criteria like customer sentiment. For example, as described in US Patent Publication 2014/0270109 A1 "Customer portal of an intelligent automated agent for a contact center" of Mar. 15, 2013.

According to some embodiments of the present disclosure, existing methods work with the expectation/assumption/consideration that the party to be conferenced is already known by either the agent or the supervisor. For example, it is assumed that the agent knows of the need to seek assistance from the supervisor, and the agent conferences the call directly with the IP endpoint, e.g., extension of the supervisor. Agent may use CTI interfaces available on his CRM screen to conference a particular supervisor. In another example, the supervisor may be monitoring calls via a dashboard or may receive alerts and would want to get conferenced to an existing call, to try to barge-in to an existing conversation using CTI interfaces provided on the application screen, which may be like a telephony conference.

According to some embodiments of the present disclosure, system 100 in FIG. 1 doesn't expect that the party to be conferenced should be known, which means that there is no inherent manual effort either on agent side or supervisor side to know which call should be conferenced to which supervisor. Thus, system 100 in FIG. 1 yield a uniform utilization of available supervisors (SMEs) in the Contact Center because the gent doesn't choose a supervisor, or a supervisor doesn't choose a call.

According to some embodiments of the present disclosure, once the conflict detector 711 may detect a conflict and may forward the call details to a 'hierarchical router' 717, it may initiate a new call on behalf of the agent in an attempt to conference with an SME, however, to identify an appropriate SME, it may add the details of the call or route the call to another instance of inbound ACD engine 719. Optionally, inbound ACD 719 may be inbound ACD 704.

According to some embodiments of the present disclosure, a user, such as SME 721-723 may login to the inbound ACD 719 which may maintain a next-level skill/hierarchical skill/Skill_2 queue. The SME 721-723 may be agents with higher skillsets and be available as part of the higher skill. The decision to identify an appropriate SME may use, apart from basic skill-based routing technique, deeper level of routing techniques of inbound ACD, like attribute-based routing.

According to some embodiments of the present disclosure, for example, when considering attribute-based routing, SMEs can login to the higher skill e.g., Skill_2 with their specialized attributes such as area of expertise, convincing abilities, soft skills score, previously resolved conflicts and the like.

According to some embodiments of the present disclosure, based on the customer issue and other criteria measured in the conflicted conversation, an SME may be selected based on the skill plus attribute and the conflicted call may be conferenced accordingly with the appropriate SME, thus implementing a uniform and expertise-based utilization of available SMEs in the contact center.

According to some embodiments of the present disclosure, for example, in a contact center with 500 agents and 75 supervisors, it may be beneficial to have the 75 supervisors login to a separate skill e.g., hierarchy skill queue so that the entire pool of supervisors that may be available to be routed for any escalated calls monitored by the system. Thus, the entire pool of 75 supervisors would be available to handle conflict-ridden calls that may occur on any of the 500 agents' conversations with customers.

According to some embodiments of the present disclosure, moreover, attribute-based skilling may be used. The supervisors can login with their specialized properties e.g., attributes keyed into the system, for example, area of expertise, convincing abilities, soft skills score, previously handled conflicts and the like. The routing of real-time conflict-ridden calls may be performed to the hierarchy skill queue 719 based on the problem scenario and matching with the attribute of the supervisor most proficient to handle the particular problem scenario. The attribute-based skilling methods may be already existing in the inbound ACD, and they would complement such a hierarchy skill of SMEs.

FIG. 8 is a high-level workflow of Agent Speech Predictor (ASP) model training 800, in accordance with some embodiments of the present disclosure.

According to some embodiments of the present disclosure, the ASP model, such as ASP model 310 in FIG. 3, may load the pretrained model and tokenizer by importing necessary modules from the transformers library, including LMHeadModel and Tokenizer 810.

According to some embodiments of the present disclosure, the pretrained model and the tokenizer may be loaded using the from_pretrained() method. A model size may be chosen (block_size), depending on the contact center needs.

According to some embodiments of the present disclosure, the script may load and process a custom domain-specific dataset. This dataset may include text data relevant to the specific domain, such as banking conversations, retail conversations, telecom provider conversations etc.

According to some embodiments of the present disclosure, TextDataset class which is a Python library may be used to tokenize the input sentences and may be used to create a dataset object, passing in the tokenizer, file path to the dataset, and block size. The block size parameter determines the maximum length of input sequences.

According to some embodiments of the present disclosure, defining training arguments by using the TrainingArguments class. These arguments specify various settings for the training process, such as the output directory where trained models may be saved, the number of training epochs, and the batch size.

According to some embodiments of the present disclosure, other settings, such as save_steps and save_total_limit, control when and how often models may be saved during training.

According to some embodiments of the present disclosure, defining a data collector 820 by using the DataCollatorForLanguageModeling class. The data collator may batchify, i.e., group a number of items together so they can be processed as a single unit and preprocess data for the language modeling training. For example, mlm=False indicates masked language modeling (MLM) may not be used.

According to some embodiments of the present disclosure, creating a trainer 830, e.g., a trainer object to facilitate the training process. The trainer may be configured with the pretrained model, training arguments, data collator, and the custom domain-specific dataset. The trainer may handle the training loop, including forward and backward passes, parameter updates, and evaluation.

According to some embodiments of the present disclosure, fine-tuning the model 840 by adjusting the model's parameters during training to better fit the domain-specific dataset. The number of epochs, batch size, and other training settings specified in the training arguments influence the training process.

According to some embodiments of the present disclosure, saving the fine-tuned model 850 once the training is complete. The fine-tuned model and tokenizer may be saved to the specified output directory using the save_pretrained() method. These saved models may be loaded and used for inference or further fine-tuning as needed.

According to some embodiments of the present disclosure, model loading 860 by importing the necessary modules form the transformers library. LMHeadModel and Tokenizer. These modules may be used to load a pre-trained ML model and tokenizer.

According to some embodiments of the present disclosure, completion generation function 870 by defining a complete_sentence function to generate completions for incomplete sentences. It takes four parameters: incomplete_sentence which is the input incomplete sentence for which completion is to be generated, model which is the pre-trained ASP AI model, tokenizer which is the tokenizer corresponding to the ASP AI model, and optionally, max_length which is maximum length of the generated completion, the default is 50 tokens.

According to some embodiments of the present disclosure, tokenization 880 of the incomplete sentence may be operated by using the tokenizer. Tokens are integer representations of words that the model can understand.

According to some embodiments of the present disclosure, completion generation 890 by forwarding the tokenized input to the model's generate() method, which may generate completions based on the provided input. Parameters, such as max_length, pad_token_id, early_stopping, no_repeat_ngram_size, top_k, top_p, temperature, num_return_sequences, and num_beams may be provided to control the generation process. These parameters influence aspects like the length of the generated completion, diversity, and the likelihood of token selection.

FIG. 9A is a screenshot of User Interface (UI) 900A for routed calls from agent to SME, in accordance with some embodiments of the present disclosure.

According to some embodiments of the present disclosure, UI 900A is a screenshot of UI from which an SME logs-in and becomes available for interactions that a conflict detector module, such as conflict-detector module 120 in FIG. 1 and conflict detector 600 in FIG. 6 has having a real-time conversational conflict, e.g., the updated conflict score is above the preconfigured conflict-threshold and are waiting in SME queue, such as queue of SMEs 150 in FIG. 1 and second queue to SMEs in Skill_2 of contact center inbound ACD 719 in FIG. 7.

Figure 9B:
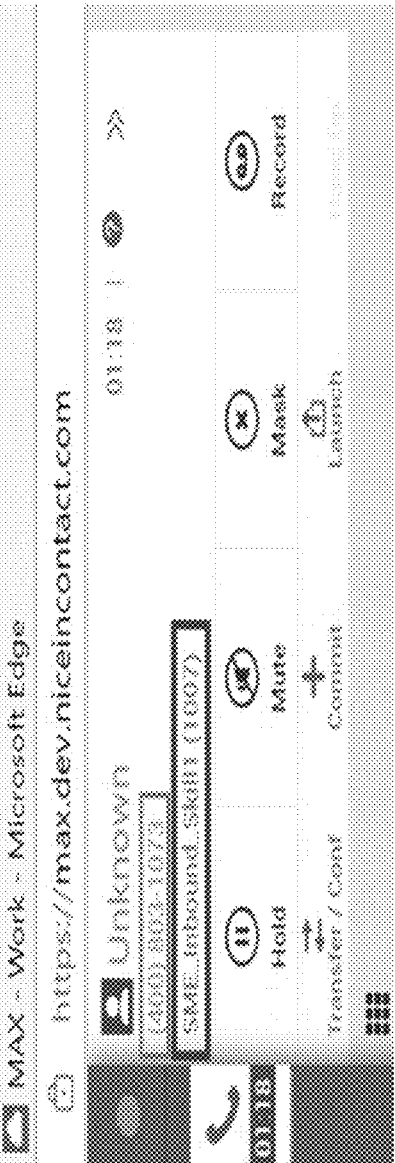

FIG. 9B is a screenshot of User Interface (UI) 900B for routed calls from agent to SME, in accordance with some embodiments of the present disclosure.

According to some embodiments of the present disclosure, UI 900B is a screenshot of UI from which the SME may join a conversation that has been detected as having real-time conversational conflict.

FIGS. 10A-10B are screenshot of UI 1000A-1000B of agent software for inbound calls, in accordance with some embodiments of the present disclosure.

According to some embodiments of the present disclosure, UI 1000A-1000B are examples of screenshots of UI of softphone which may be used by a customer to initiate a call to the contact center.

According to some embodiments of the present disclosure, a trace output of incoming calls to the contact center from the customer to the contact center software may be initiated. The Studio script 'ASR_Test' may be assigned to this inbound call and it goes through each action in the script. During the ASR action, of the SR engine, such as SR engine 307 in FIG. 3, it may play a greeting. wav file and may listen to the customer speech in parallel. based on the conflict score above the preconfigured conflict-threshold the call may proceed to the action with parameters, including skill_no 1007, which means that in this call, it tries to find a resource who is logged in to Skill 1007.

FIG. 10C is a screenshot of UI 1000C of agent software for inbound calls, in accordance with some embodiments of the present disclosure.

According to some embodiments of the present disclosure, when a conversational conflict is detected during a real-time conversation in a system, such as system 100 in FIG. 1, the conversational conflict may be detected based on negative key words provided in the PhraseList parameter. Based on key phrases match, the SR engine, such as SR engine 307 in FIG. 3, may detect a conflict score above the preconfigured conflict-threshold, e.g., 'HighConfidence' score for this call.

According to some embodiments of the present disclosure, UI 1000C is an example of a screenshot which may be displayed when an SME may be available in Skill 1007, e.g., SME_Inbound_Skill1, SME_Inbound_Skill1 (1007), the SME may be connected with the customer and upon user click on the 'accept' button and they may start talking. The customer's phone number: (400)803-1073 may be received by the contact center in the ANI field.

Figure 10D:
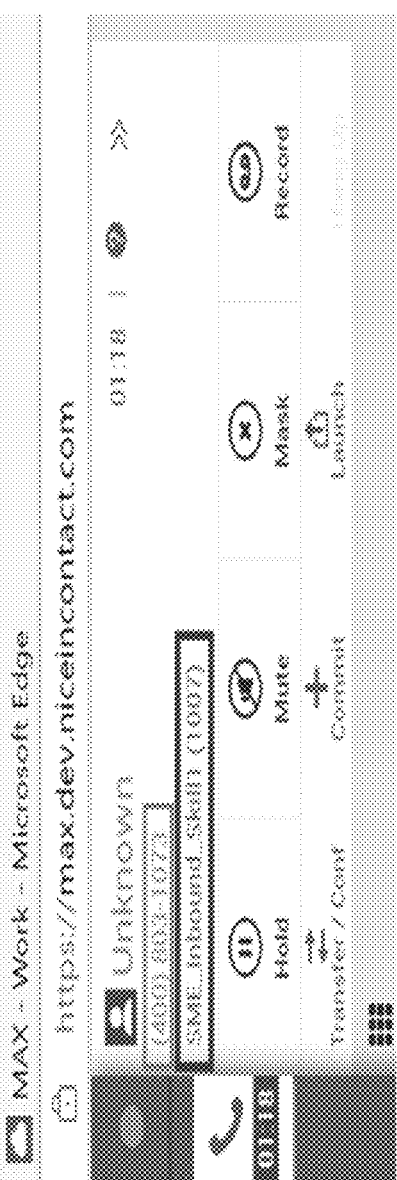

FIG. 10D is a screenshot of UI 1000D of agent software for inbound calls, in accordance with some embodiments of the present disclosure.

According to some embodiments of the present disclosure, UI 1000D is an example of a screenshot of the customer and the SME talking.

Figure 10E:
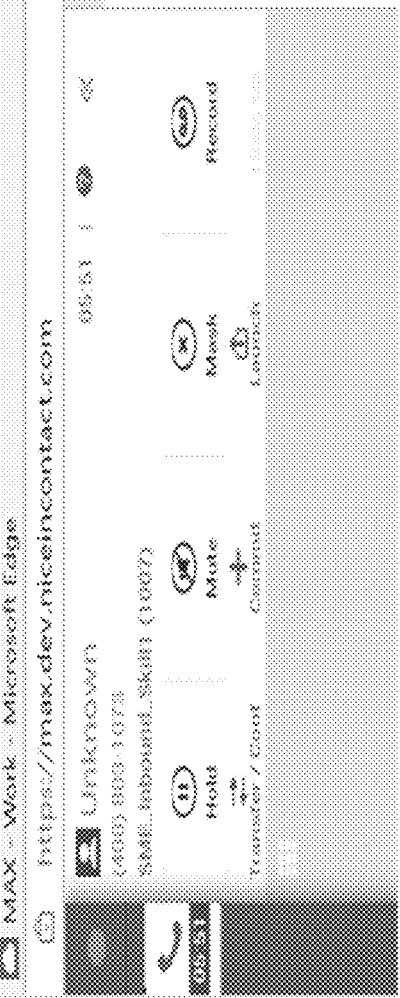

FIG. 10E is a screenshot of UI 1000E of agent software for inbound calls, in accordance with some embodiments of the present disclosure.

According to some embodiments of the present disclosure, UI 1000E is an example of a screenshot of the customer and the SME talking.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for identifying and addressing a real-time conversational conflict in a contact center, said computerized-method comprising:

(i) monitoring by one or more processors an interaction between an agent and a customer;

(ii) continuously updating a conflict-score during the interaction when a conversational-cut is detected, by operating by the one or more processors a conflict-detector module, wherein the conversational-cut is a point in the interaction that the agent speech is interrupted by the customer and the agent stops speaking, and wherein said conflict-detector module comprising:

a. determining an interruption and related timestamp when the agent was speaking at the time that the customer started to speak and the agent stopped speaking after the customer started to speak, by operating a voice analyzer;

b. when the interruption has been determined, retrieving real-time transcripts of customer speech and agent speech, wherein said real-time transcripts of customer speech and agent speech have been generated by a Speech Recognition (SR) engine;

c. generating customer-transcript segments of the real-time transcripts of the customer and agent-transcript segments of the real-time transcripts of the agent by operating a transcript analyzer;

d. predicting a remaining portion of agent speech by operating a trained Agent Speech Predictor (ASP) engine;

e. operating sentiment analysis on the customer-transcript segments and the agent-transcript segments by operating a sentiment analyzer; and f. detecting the conversational-cut when the predicted remaining portion of agent speech is greater than a preconfigured threshold, wherein the related agent-transcript segments and predicted agent-transcript segments are stored in a database after the conversational-cut has been detected, and (iii) addressing the real-time conversational conflict when the updated conflict-score is above a preconfigured conflict-threshold by routing the interaction to a queue of Subject Matter Experts (SME) s of an Automatic Calls Distributor (ACD) application.

2. The computerized-method of claim 1, wherein said voice analyzer comprising:

(i) streaming agent speech via a first Real-time Transport Protocol (RTP) port and streaming customer speech via a second RTP port;

(ii) extracting audio data from the first RTP port and the second RTP port and transcoding the extracted audio data into linear samples in floating point format;

(iii) organizing the linear samples into an audio-frames sequence;

(iv) removing noise audio-frames from the audio-frames sequence;

(v) detecting each start of sentence in a customer speech and in an agent speech by operating a pattern recognizer; and (vi) detecting if the agent was still speaking when the customer started to speak and if the agent stopped speaking after the customer started to speak.

3. The computerized-method of claim 2, wherein said voice analyzer further comprising identifying a category of the audio-frame as one of: a. silent; b. voice; and c. noise, and wherein said voice analyzer is identifying the category of the audio-frame by estimating amount of energy in each audio-frame in the audio-frames by operating a time domain analysis.

4. The computerized-method of claim 3, wherein the audio-frame is identified as silent when the estimated amount of energy is less than a preconfigured dynamic-threshold.

5. The computerized-method of claim 2, wherein said voice analyzer is detecting each start of sentence by marking of a timestamp of a first voice audio-frame as a start of sentence, and wherein the marking of the timestamp is performed by operating a pattern recognizer, said pattern recognizer comprising processing a set of instructions for each pattern of audio-frames in category silence and audio frames in category voice in the audio-frames sequence to detect a start of sentence timestamp.

6. The computerized-method of claim 2, wherein said voice analyzer is detecting if the agent stopped speaking after the customer interrupted the agent and started to speak while the agent was speaking, by checking if there were no voice audio-frames of the agent with marked timestamp in a preconfigured time-distance to the marked timestamp of the voice audio-frames denoting start of the interrupted sentence of the customer.

7. The computerized-method of claim 1, wherein said SR engine comprising: listening to the first RTP port to generate real-time agent-transcripts and listening to the second RTP port to generate real-time customer-transcripts, and wherein said transcript analyzer comprising:

(i) extracting from the real-time transcripts of the customer, customer-transcript segments, based on the interruption related timestamp; and (ii) extracting from the real-time transcripts of the agent, agent-transcript segments, based the interruption related timestamp.

8. The computerized-method of claim 1, wherein said ASP engine is an Artificial Intelligence (AI) model that is trained to predict the remaining portion of the agent speech based on speech corpus having customer-agent interactions of contact center companies from different domains.

9. The computerized-method of claim 1, wherein said sentiment analyzer comprising:

(i) operating sentiment analysis on the customer-transcript segments to yield a customer sentiment, wherein customer sentiment is one of: positive, negative and neutral; and (ii) when the yielded customer sentiment is negative:

a. comparing the customer-transcript segments with the agent-transcript segments and the predicted agent-transcript segments to determine level of usefulness of the agent's response to the customer's query; and thereby determining a level of genuineness of the customer sentiment; and b. updating a weight that is assigned to the conversational-cut based on the determined level of genuineness.

10. The computerized-method of claim 1, wherein the interaction is routed based on conflict-score by the ACD application to a queue of Subject Matter Experts (SMEs).

\* \* \* \* \*